US010839629B2

(12) United States Patent
Jones et al.

(10) Patent No.: US 10,839,629 B2
(45) Date of Patent: Nov. 17, 2020

(54) WIRELESS WEARABLES AND RELATED SYSTEMS AND METHODS

(71) Applicant: BARA Tech, LLC, Midvale, UT (US)

(72) Inventors: Brighton Jones, Sandy, UT (US);
Aaron Dalley, Springville, UT (US);
Arthur Mrozowski, Aptos, CA (US)

(73) Assignee: BARA Tech, LLC, Midvale, UT (US)

( * ) Notice: Subject to any disclaimer, the term of this patent is extended or adjusted under 35 U.S.C. 154(b) by 0 days.

(21) Appl. No.: 16/413,601

(22) Filed: May 16, 2019

(65) Prior Publication Data

US 2019/0355191 A1 Nov. 21, 2019

Related U.S. Application Data

(60) Provisional application No. 62/672,537, filed on May 16, 2018.

(51) Int. Cl.
G07C 9/28 (2020.01)
H04B 5/00 (2006.01)
G06K 7/14 (2006.01)
G06K 7/10 (2006.01)
G06Q 10/10 (2012.01)

(52) U.S. Cl.
CPC ........... G07C 9/28 (2020.01); G06K 7/10297 (2013.01); G06K 7/1417 (2013.01); G06Q 10/1091 (2013.01); H04B 5/0062 (2013.01)

(58) Field of Classification Search
None
See application file for complete search history.

(56) References Cited

U.S. PATENT DOCUMENTS 10,635,173 B2 *  4/2020  Lim .................. G06F 3/033
2019/0043281 A1 *  2/2019  Aman ................ A63G 31/16

OTHER PUBLICATIONS

MagicMoney.com website images, published at least as early as Mar. 10, 2018, available online at MagicMoney.com, last visited May 11, 2019.
"Five Reasons Why Events are Going Cashless, Five Misconceptions, and How Magic Money is Disproving Them by Facilitating a Seamless Shift to Digital Ticketing," published online at least as early as May 15, 2018, available online at https://magicmoney.com/wp-content/uploads/2018/03/Five_Reasons_Events_Are_Going_Cashless-Magic-Money.pdf last visited May 11, 2019.

(Continued)

Primary Examiner — Kristy A Haupt
(74) Attorney, Agent, or Firm — Law Office of Paul B. Johnson; Paul B. Johnson

(57) ABSTRACT

Disclosed herein are wireless wearables and related systems and methods. The wireless wearables are devices worn by a user (and/or attached to clothing and/or accouterments of a user) and are configured to receive and send data based on one or more wireless communication technologies, such as for authentication for a variety of purposes. The wearables may include, by non-limiting examples: rings (finger rings and/or toe rings), necklaces, earrings, piercings, clasps, watch bands, charms, cuff links, pins or clip elements attachable to clothing, pins or clip elements attachable to a bill of a hat, and clip or magnetic elements attachable to glasses (eyeglasses, sunglasses, virtual reality glasses, augmented reality glasses, and so forth).

6 Claims, 22 Drawing Sheets

(56) References Cited

OTHER PUBLICATIONS

LiveNation Festival Passport, published online at least as early as May 15, 2018, available online at https://www.livenation.com/passport/, last visited May 11, 2019.

Bulzi Massaging Comfort Fit Silicone Wedding Ring, for sale on Amazon.com at least as early as Aug. 28, 2015, last visited Aug. 3, 2018, available online at https://www.amazon.com/BULZi-Massaging-Silicone-Comfortable-Flexible/dp/ B00ZBQ46UI/ref=sr_1_2?ie=UTF8&qid=1533333654&sr=8-2&keywords=bulzi+ring&dpID=41PKEvYBRwL&preST=_SY300_QL70_&dpSrc=srch.

* cited by examiner

WIRELESS WEARABLES AND RELATED SYSTEMS AND METHODS

CROSS REFERENCE TO RELATED APPLICATIONS

This document claims the benefit of the filing date of U.S. Provisional Patent Application No. 62/672,537, entitled "Wireless Rings and Related Systems and Methods," naming as first inventor Brighton Jones, which was filed on May 16, 2018, the disclosure of which is hereby incorporated entirely herein by reference.

BACKGROUND

1. Technical Field

Aspects of this document relate generally to wireless authentication systems.

2. Background Art

Wireless authentication systems are used to provide authentication to a transaction or event. For example, radio frequency identification (RFID) cards (key cards) are often used to authenticate a user for entrance to a building. RFID bracelets and RFID lanyards have also been used for entrance/admission into theme parks, concerts and/or other events/locations.

SUMMARY

Embodiments of wireless wearable systems may include: an admin computing device communicatively coupled with a database; an event organizer computing device communicatively coupled with the database; one or more user interfaces displayed on the event organizer computing device and configured to, in response to receiving user input, store an attendee list in the database, the attendee list including attendee names and one of attendee email addresses and attendee phone numbers; an attendee computing device communicatively coupled with the database; a wireless wearable having a Near Field Communications (NFC) chip embedded therein; one or more user interfaces displayed on the attendee computing device and configured to, in response to receiving user input, associate the wireless wearable with an attendee through the database; and a checkpoint device communicatively coupled with the database and configured to send an NFC interrogating signal to the wireless wearable and, in response to receiving a response NFC signal from the wireless wearable, display an indication of whether the attendee is authorized to enter an event.

Embodiments of wireless wearable systems may include one or more or all of the following:

The wireless wearable may be a finger ring formed of an elastic polymer.

The one or more user interfaces displayed on the event organizer computing device may be further configured to, in response to receiving user input, define multiple zones of the event and define zone permissions for the wireless wearable.

The one or more user interfaces displayed on the event organizer computing device may be configured to allow zone permissions for a group of multiple wireless wearables to be defined simultaneously.

The one or more user interfaces displayed on the event organizer computing device may be configured to allow unique zone permissions for individual wireless wearables to be defined one at a time.

One or more user interfaces of the checkpoint device may be configured to, in response to receiving user input, edit the zone permissions for the wireless wearable.

The one or more user interfaces of the checkpoint device may be configured to, in response to receiving user input, block the wireless wearable from all zones.

One or more user interfaces of the checkpoint device may further display a list of previous zone entries and previous zone exits for the wireless wearable.

One or more user interfaces of the checkpoint device may further display a name of the attendee.

The one or more user interfaces of the event organizer computing device may be configured to, in response to receiving user input, define access to features in a mobile application running on the checkpoint device.

The one or more user interfaces displayed on the attendee computing device may be configured to, in response to receiving user input, store a photograph of the attendee in the database; and the checkpoint device may be configured to, in response to receiving the response NFC signal from the wireless wearable, display the photograph on one or more user interfaces of the checkpoint device.

Embodiments of wireless wearable methods may include: sending a wireless wearable, packaged within a container, to an event organizer, the wireless wearable comprising a wearable item fully encasing a Near Field Communication (NFC) chip; receiving, at one or more servers communicatively coupled with a database, from the event organizer, through one or more interfaces of an event organizer computer communicatively coupled with the database, a first code associated through the database with the wireless wearable; receiving at the one or more servers, from an attendee, through one or more interfaces of an attendee computing device communicatively coupled with the database, a second code associated through the database with the wireless wearable; receiving at the one or more servers, from a checkpoint device communicatively coupled with the database, an NFC code of the NFC chip; and sending to the checkpoint device, from the one or more servers, in response to receiving the NFC code of the NFC chip, an indication of whether the attendee is authorized for entry into an event.

Embodiments of wireless wearable methods may include one or more or all of the following:

The first code may be located outside of the container, and the second code may be located inside the container until the container has been opened.

Sending the wireless wearable may include enclosing the wireless wearable in a metallic foil shield to prevent reading of the NFC code until the container is opened.

The first code may be a first QR code (QR1), the second code may be a second QR code (QR2), the method may further include storing in the database, in response to receiving user input at one or more user interfaces displayed on an administrator computing device communicatively coupled with the database, the NFC code of the NFC chip, QR1, QR2, a first identifier (ID1), and a second identifier (ID2); and the method may further include, through the database, associating the NFC code and QR2 with ID2, associating QR1 with ID1, and associating ID1 with ID2.

The method may further include, in response to receiving user input at the one or more user interfaces displayed on the administrator computing device, associating a batch number with the wireless wearable through the database and associating an indicator of the event organizer with the wireless wearable through the database.

Embodiments of wireless wearable systems may include: a finger ring formed of an elastic polymer and having a Near Field Communication (NFC) chip embedded therein; an admin computing device communicatively coupled with a database and displaying one or more interfaces for storing and associating data within the database; wherein the database has stored therein a first identifier (ID1), a second identifier (ID2), a first quick response code (QR1), a second quick response code (QR2), and an NFC code of the NFC chip; and wherein, through the database, ID1 is associated with QR1, ID1 is associated with ID2, and ID2 is associated with the NFC code and with QR2.

Embodiments of wireless wearable systems may include one or more or all of the following:

The system may include a container for the finger ring, wherein QR1 is located outside the container so that it is visible before the container is opened.

The system may further include a container for the finger ring, wherein QR2 is located inside the container so that it is not visible until the container is opened.

The container may further include a metallic foil shield configured to prevent reading the NFC code of the NFC chip until the finger ring is removed from within the metallic foil shield.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements.

DESCRIPTION

Implementations/embodiments disclosed herein (including those not expressly discussed in detail) are not limited to the particular components or procedures described herein. Additional or alternative components, assembly procedures, and/or methods of use consistent with the intended wireless wearables (wearables) and related systems and methods may be utilized in any implementation. This may include any materials, components, sub-components, methods, sub-methods, steps, and so forth.

The systems and methods described herein could be used in conjunction with a number of wearables, such as by non-limiting example: rings (finger rings and/or toe rings); necklaces, earrings, piercings, clasps, watch bands, charms, cuff links, pins or clip elements attachable to clothing, pins or other clip element attachable to a bill of a hat, clip or magnetic elements attachable to glasses (eyeglasses, sunglasses, virtual reality glasses and/or augmented reality glasses), and so forth.

Implementations of wireless communicating wearables (hereinafter "wireless wearables" or "wearables") and related methods relate to wearable devices worn by users that can receive and send data based on one or more wireless communication technologies.

In implementations a wireless wearable may be a ring and, in such implementations, the ring may include one or any or all of the features of rings disclosed in: U.S. Provisional Patent Ap. No. 62/396,962, titled "Breathable Rings," filed Sep. 20, 2016, listing as first inventor Brighton Jones; U.S. Nonprovisional Design patent application Ser. No. 29/605,278, titled "Breathable Ring," filed May 24, 2017, listing as first inventor Brighton Jones; U.S. Nonprovisional Utility patent application Ser. No. 15/706,574, titled "Breathable, Expandable, and Antimicrobial Rings," filed Sep. 15, 2017, listing as first inventor Brighton Jones; and U.S. Nonprovisional Utility patent application Ser. No. 16/219,956, titled "Breathable and Expandable Rings," filed Dec. 14, 2018, listing as first inventor Brighton Jones, the disclosures of each of which are hereby entirely incorporated herein by reference.

Figure 1:
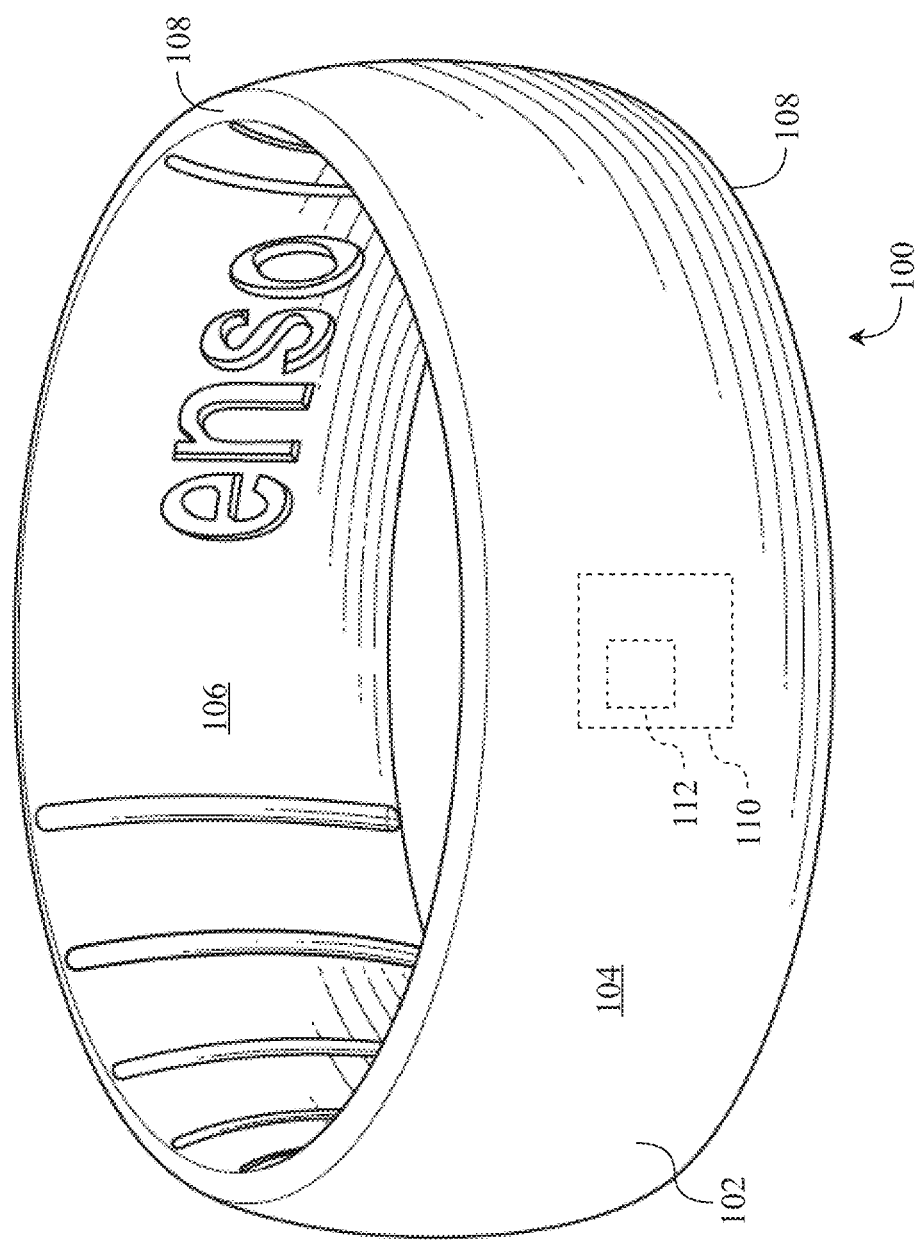
FIG. 1 is a front perspective view of an implementation of a wireless wearable.

Referring now to FIG. 1, a representative example of a wireless wearable is shown. Wireless wearable 100 is a ring having a ring body 102 with an outer surface 104, inner surface 106, and sidewall 108. The ring body in the shown implementation is formed of an elastic material. In this implementation the ring is formed of silicone and has a number of stylized visible grooves on the inner surface of the ring. In other implementations the ring body could be made of a different material, though forming the ring of a polymer has the advantage of making the ring elastic and pliable, which has several advantages described in the aforementioned '962, '278, '574 and '956 patent applications. Forming the ring of a polymer also has the advantage of facilitating the easy complete encapsulation of a wireless chip.

Figure 2:
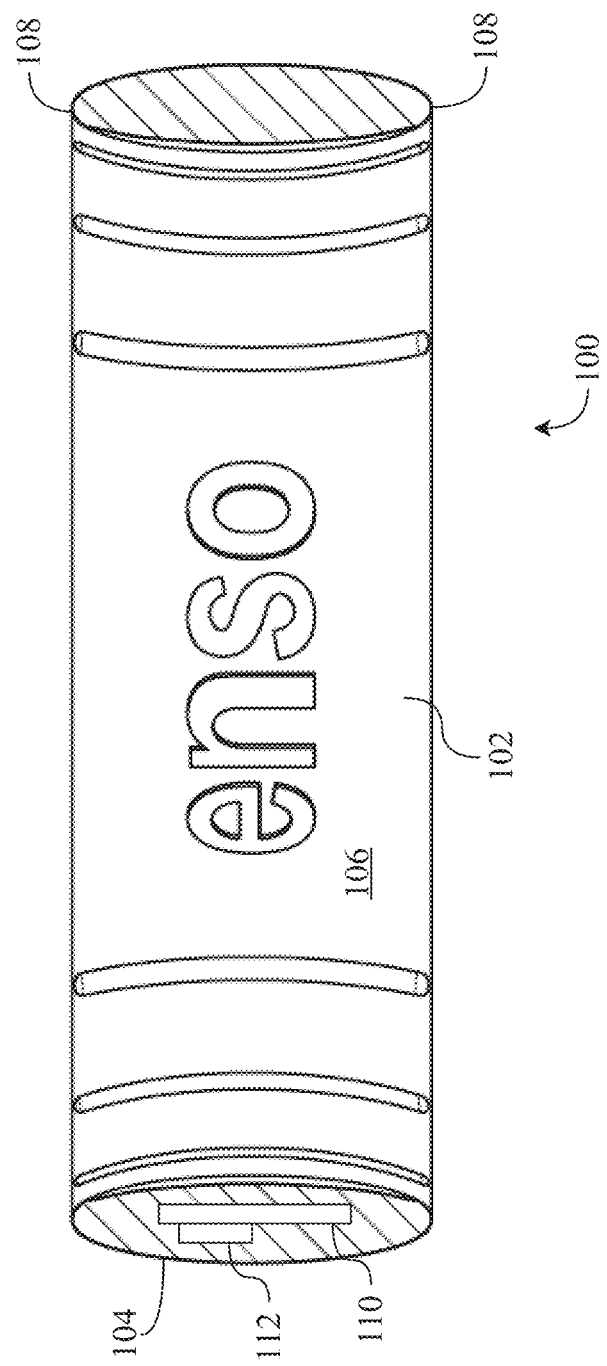
FIG. 2 is a cross-section view of the wireless wearable of FIG. 1.

The wireless ring of FIGS. 1-2 is seen to have a communication chip (hereinafter "chip") 112 coupled with a chip board 110, the chip and chip board entirely encapsulated within the ring. In implementations the chip board may be excluded and only the chip (such as a system on a chip or SoC) may be included. The chip and chip board are shown molded entirely within the width of the ring and could be located therein in any desired place (for example closer to the inner surface or, to facilitate better communication, closer to the outer surface). The chip could also be centered between the sidewalls or nearer to either sidewall.

In implementations in which the chip is encapsulated within the ring body material it could have one or more elements of the chip (or one or more elements electrically coupled with the chip) exposed through an opening in the ring body—for example one or more light emitting diodes (LEDs) exposed through the outer surface or a sidewall of the ring which indicate when a signal is received or the like. In other implementations LEDs may be included and may be fully encapsulated within the ring body but may still be visible through the ring material when in an on state.

In other implementations the chip could be permanently or removably attached to any outer surface of the ring body, such as the outer surface, the inner surface, and/or at a sidewall—such as by a reusable adhesive or snap-on or friction fit or the like—but encapsulating the chip fully within the ring has the advantage of providing some environmental protection for the chip and reducing the likelihood of the chip being separated from the ring and/or lost.

In implementations the communication chip could use any of a variety of communication types and/or protocols, such as a Radio Frequency Identification (RFID) or Near Field Communication (NFC). In the implementations shown the chip is a passive NFC chip and accordingly may be fully encapsulated within the ring for communication purposes without requiring a power source (other than the interrogating signal(s)). Some LEDs would require a power source, but in implementations the chip will include and/or be coupled with one or more organic LEDs (OLEDs) which may be powered sufficiently by the interrogating signals alone to allow the OLEDs to power on to signal some event (such as a successful match with a blinking green OLED, or a non-match with a blinking red OLED, and/or the like). While the chip shown here is a passive NFC chip, in implementations in which a power source other than the interrogating signal is used an active RFID or active NFC chip could be used, or other communication technologies such as BLUETOOTH or other wireless protocols could be used. The use of passive RFID or passive NFC, as explained, has the advantage of allowing the ring to have no power source attached to or within the ring.

The chip and/or chip board may include one or more antennas, such as formed by metallic depositions on one or both sides of the chip board (such as a millimeter-sized antenna on both sides of a printed circuit board or PCB on which the chip is located, the entire chip and PCB then embedded within the ring body). Any antenna types now known or hereafter discovered for use with chip designs may be used, and/or a separate antenna may be encapsulated within the ring and communicatively coupled with the chip, to extend the range of the wireless ring. The antenna(s) could be used to allow the ring to receive and send signals farther distances. In some implementations (particularly those in which the chip is placed towards the outer surface of the ring or even having an exposed surface through the ring) the antenna may be excluded, and of course for NFC communications the chip and antenna may be designed to require a close proximity of the wearable and an authorizing device so as to avoid fraudulent activities or data theft. In implementations in which the chip is embedded in the ring the ring may have some logo or image or color or the like to indicate to the user approximately where the chip is located within the ring so the user may place that portion of the ring closest to a reader. The ring in implementations may function by a user touching the ring to the reader or simply by placing it within a certain range of the reader. Without an antenna, in implementations the ring may need to be within about 1-2 inches of a reader to be read.

In other implementations an antenna may be embedded within the ring material and electrically coupled with the chip during manufacturing of the ring, the chip and/or PCB itself not having any antenna directly thereon.

The wireless wearable may be placed close to an interrogating device (or within an interrogation zone) to receive an interrogation signal and send a response signal for identification purposes. The interrogating device may be a smartphone or other computing device with a radio frequency (RF) transmitter and/or NFC transmitter, a stationary RFID or NFC device located near a door (such as for unlocking a door only for authorized users), a standalone handheld RFID or NFC reader, and so forth.

FIG. 2 shows a cross-section view of the wireless wearable of FIG. 1 showing how the chip and/or chip board may be fully encapsulated within the wearable.

Figure 3:
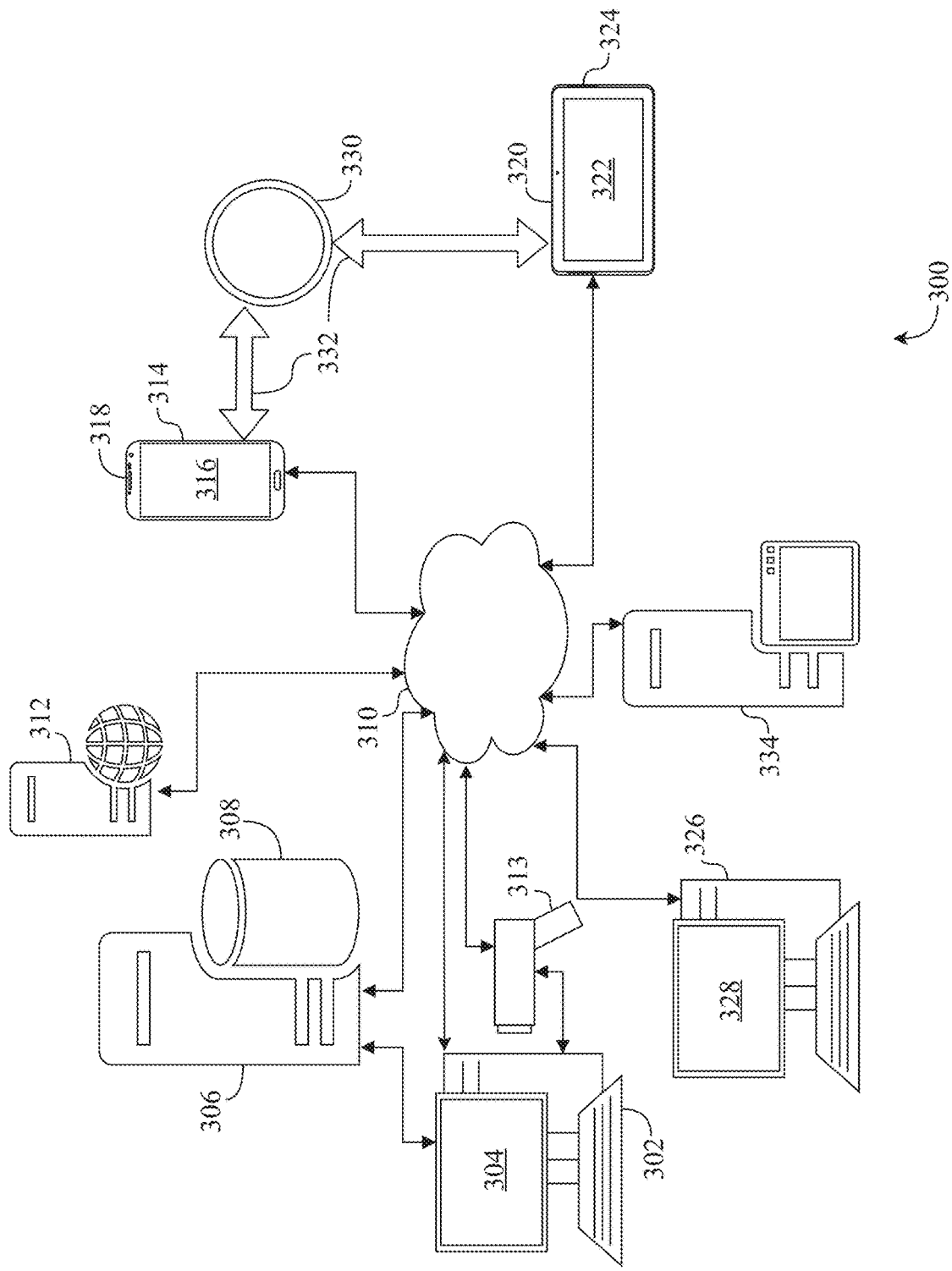
FIG. 3 is block diagram of an implementation of a wireless wearable system.

A computer network system such as that shown in FIG. 3 may facilitate the use of one or more wireless wearables. FIG. 3 shows a network 300 which includes a first computing device 302 having a display 304. An administrator may utilize device 302 to set up desired configurations for the system, including system settings, database details, login credentials for event organizers, and so forth. Device 302 is communicatively coupled with one or more database (DB) servers 306 and, thereby, with one or more databases 308, either directly and/or through a telecommunication network 310 such as the Internet or a local area network (LAN). Although a local DB server and DBs are shown, the system could use remote cloud servers and databases. The administrator may configure user interfaces to be shown on other user devices coupled with the system in order for users to store information to (and retrieve it from) the databases (such as event organizer interfaces, event attendee or end user interfaces, and so forth. Although device 302 is shown as a desktop computer it could instead be a laptop, a tablet, a mobile device, a smart phone, and so forth. One or more administrator interfaces displayed on display 304 may allow the administrator to associate certain wireless wearables with identification numbers through the database so that each wireless wearable has one or more unique identifiers associated with it.

Figure 4:
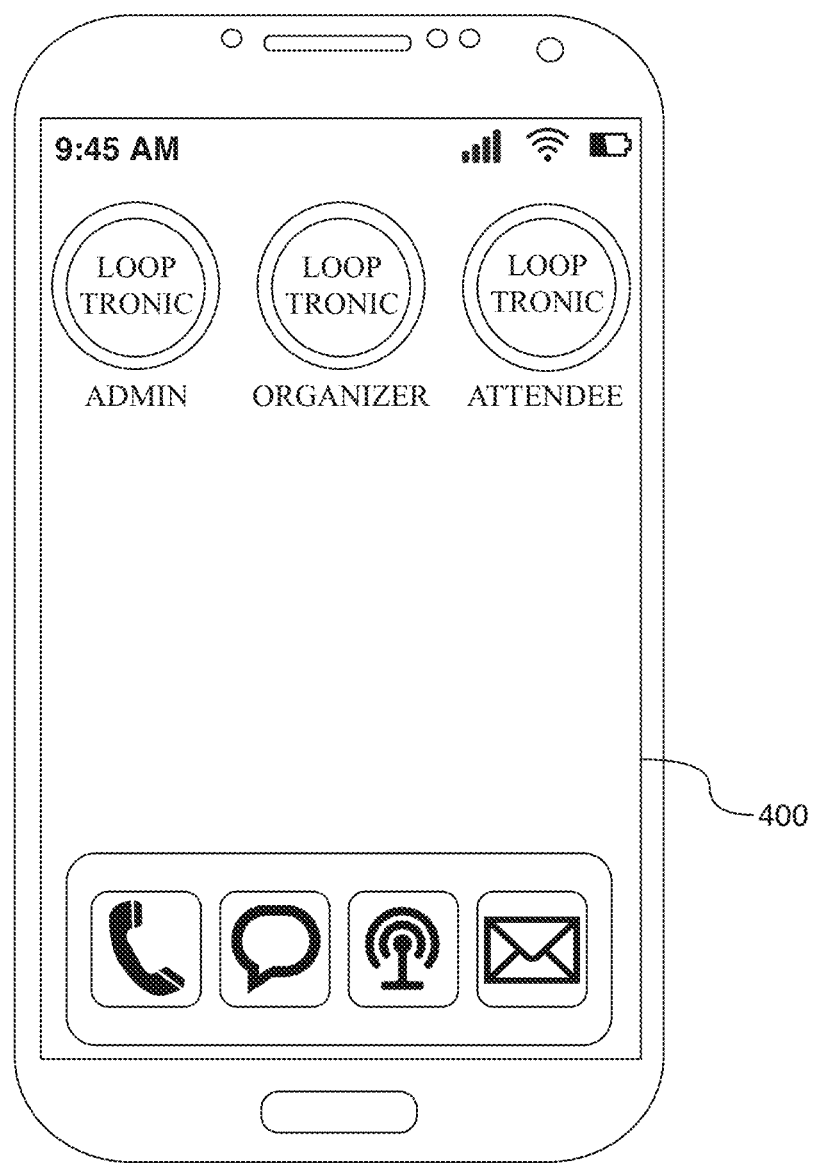
FIG. 4 is a front view of an interface of the system of FIG. 3.

For example, FIG. 4 shows a user interface 400 shown on a mobile device, the mobile device having a number of software applications installed, shown in FIG. 4 as LOOPTRONIC ADMIN, LOOPTRONIC ORGANIZER, and LOOPTRONIC ATTENDEE. In this example the software apps are shown being implemented as three separate apps for different users (administrators, event organizers, and event attendees) of the system. In other implementations only a single software application could be used and a user could indicate, upon first installing the app or upon executing the app later, whether the user is an admin, an event organizer, or an attendee (or some other function such as a door authorizer/bouncer) to bring up the appropriate user interfaces to implement the system functionality. In implementations one or more such apps may be implemented using one or more application servers 334 shown in FIG. 4. Additionally, although the apps are shown as being accessed using mobile devices, in implementations some or all of the same functionality could be implemented using a desktop computer, a laptop, and so forth (albeit in some instances needing a connected or coupled NFC/RFID reader).

Administrator Interfaces

Interfaces of the ADMIN version of the app (and/or a website interface made available such as through one or more web servers 312) may allow the admin to assign different types of identifiers to certain wireless wearables. For example, an administrator could, using one or more interfaces displayed on a mobile device through the ADMIN app, and/or using one or more RFID/NFC encoders, assign certain identifiers to each wireless wearable. The administrator could assign/associate, through the database, a batch number to a group of wireless wearables, and the administrator may associate this batch number with a given event organizer through the database so that the wireless wearables from this batch show up on the event organizer's user interfaces, described in more detail below. Once this batch number is assigned, each individual wireless wearable is associated through the database with a batch number.

In implementations the administrator also assigns/associates a number of other identifiers/codes with each individual wireless wearable and with one another through the database. The first identifier, ID1, is associated with the individual wireless wearable through the database. The second identifier, ID2, is also associated with the individual wireless wearable through the database. ID1 is further associated with a first quick response code (QR1) (though in other implementations it could be a bar code or other code readable by a mobile device) through the database. ID2 is further associated with a second quick response code (QR2) (though in other implementations it could be a bar code or other code readable by a mobile device) through the database. ID2 is also further associated with an NFC/RFID identifier/code encoded in the chip of the wireless wearable. Finally, ID1 and ID2 are associated with one another through the database.

In implementations the administrator could input and/or edit a wireless wearable type description (such as color, type of wearable such as ring, bracelet, specific wearable model such as an INFINITY white silicone ring, etc.) and associate the same with the ring through the database and, accordingly, with pre-saved images of the type of wearable of the specific model and color for later display through the one or more apps (such as during an authentication event). Any of the identifiers/codes could comprise any alphanumeric characters and/or any other symbols.

In implementations the administrator could associate a default NFC/RFID code/identifier with the wireless wearable through the database (for example a code/identifier pre-encoded on the chip), though in other implementations the administrator could encode a unique NFC/RFID code/identifier on the chip so as to not use the default pre-encoded value, and associate the new code/identifier with the wireless wearable through the database. The new encoding could be done with a dedicated encoder device 313 (which may be communicatively coupled directly with device 302 and or otherwise with device 302 and the database 308 through the telecommunications network) or in some implementations could be done using a mobile device such as a smart phone with built-in RFID/NFC encoding capability.

Figure 20:
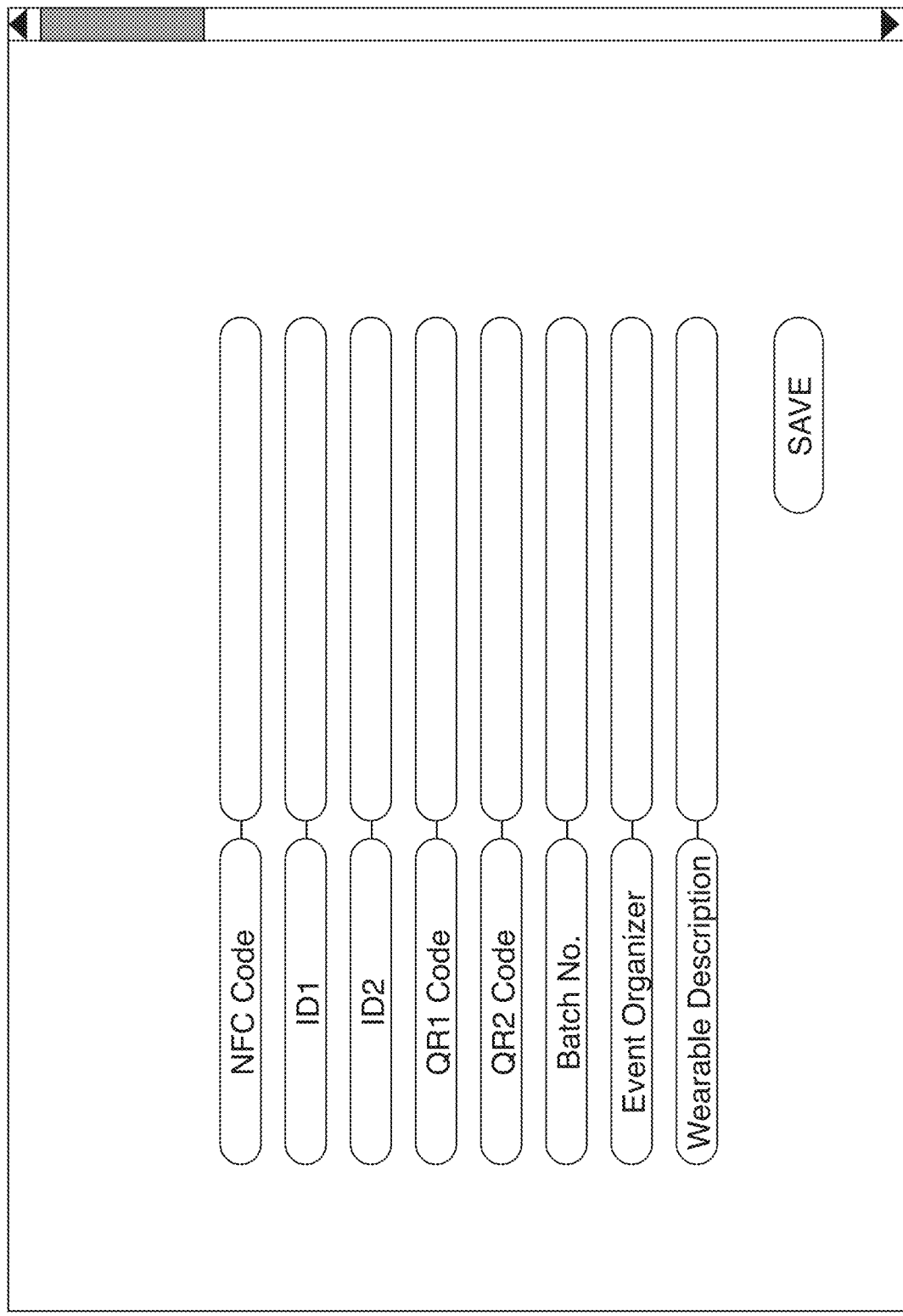
FIG. 20 is a front view of another interface of the system of FIG. 3.

FIG. 20 shows one representative example of how to accomplish the above database associations. Interface 2000 is an example of an administrator interface which allows an administrator to input an NFC code, an ID1 value, an ID2 value, a QR1 code, a QR2 code, a batch number, an event organizer identifier (which could be selected through a dropdown menu pulling values that have previously been input through another interface), and a wearable description (which could be selected through a dropdown menu pulling values that have previously been input through another interface). In this representative example, the administrator may be able to input all of these values, select the SAVE selector, and the values will be stored in the one or more databases with the above mentioned associations generated automatically.

The administrator interface(s) may in implementations further include the following features (although not all of these are shown in the drawings, the practitioner of ordinary skill in the art will know how to set these up without illustration): allowing the administrator to add event organizer details (such as name, contact information, etc.) to, and remove them from, the one or more databases; allowing the administrator to associate a group or batch of wireless wearables to a specific event organizer through the one or more databases; allowing the administrator to see global statistics about events; allowing the administrator to see event attendee information; allowing the administrator to custom tailor event organizer interfaces for specific event organizers according to negotiated details; and allowing the administrator to bulk download any of the above details such as in comma separated value (CSV) or other format.

Use Case

In implementations a wireless wearable may be used in the following manner. Using one or more event organizer interfaces (described below) the event organizer adds an event and associates an event ID with the event through the database (the event ID could be, for example, simply an event name, though it could also be an automated event ID that is some alphanumeric code generated automatically by the system and stored in the one or more databases when the new event is generated even if not visible to the event organizer). The event organizer may further add a guest list to the event (including for example names and email addresses) so that each guest is associated with the event (and the event ID) through the database. The wireless wearable batch number may already be associated through the database with the event organizer. The administrator mails the batch of wireless wearables to the event organizer. When the wireless wearables arrive, printed on the outside of the packaging of each individual wireless wearable is the QR1 code associated with that individual wireless wearable through the database. Using an interface of the ADMIN mobile app (see FIG. 4) the event organizer scans QR1 and associates it, through the database, with one of the persons on the guest list (in other words associates it with the guest's name and email address, for example, through the database).

The event organizer also associates the QR1 code with the event ID (though this may be done automatically by associating the QR1 code with the guest from the guest list already associated with the event ID). In implementations the event organizer further associates the QR1 code and/or the guest with zone rights through the database. As an example, in an implementation the event organizer could designate a certain number of zones of the event (by non-limiting example, ten zones indicating ten areas of the event), and the event organizer may associate the QR1 code with rights for specific zones (such as allowing the guest to enter zones 1-5 and 7 but not enter zones 6 and 8-10). To implement this the authorization at the event would be done by zones, so that for example end users would need to use their wireless wearable to authorize entry into specific zones. This could be done with standalone devices allowing a door or other device to allow passage or it could be done by an employee or contractor of the event organizer using the ORGANIZER app and indicating, through the app (or it previously being indicated by the event organizer through the event organizer interface(s)) which zone that employee/contractor is stationed at. For example the employee/contractor mobile device (number) or other employee credentials (name, email) could be stored in the database and the event organizer could associate one or more of these with a specific zone (for example, in FIG. 17 the event organizer has associated employee/contractor names and emails with roles and, in one case, with a specific zone). The event organizer could change the assignment, for example changing Bob Smith in FIG. 17 to Bouncer/Zone 1 or the like.

The event organizer in implementations also associates the QR1 code and/or the attendee name/credentials with date and time of access for the event. For example the attendee may only be allowed to enter an event starting on Friday, May 1 at 9 AM. The event organizer may also be able to associate a time period of allowed access with the QR1 code or the attendee name/credentials, such as a four hour window. These combined allow the event organizer to, for example, designate ranges, such as allowing an attendee access on Friday, May 1 from 9 AM to 3 PM and then on Saturday, May 2 from 6 PM to 9 PM. In implementations the event organizer also may associate the QR1 code and/or the attendee credentials with an age limit for the event (for example 21 for events including alcohol). This could include a minimum age for the event and/or could include a maximum age for the event.

Figure 21:
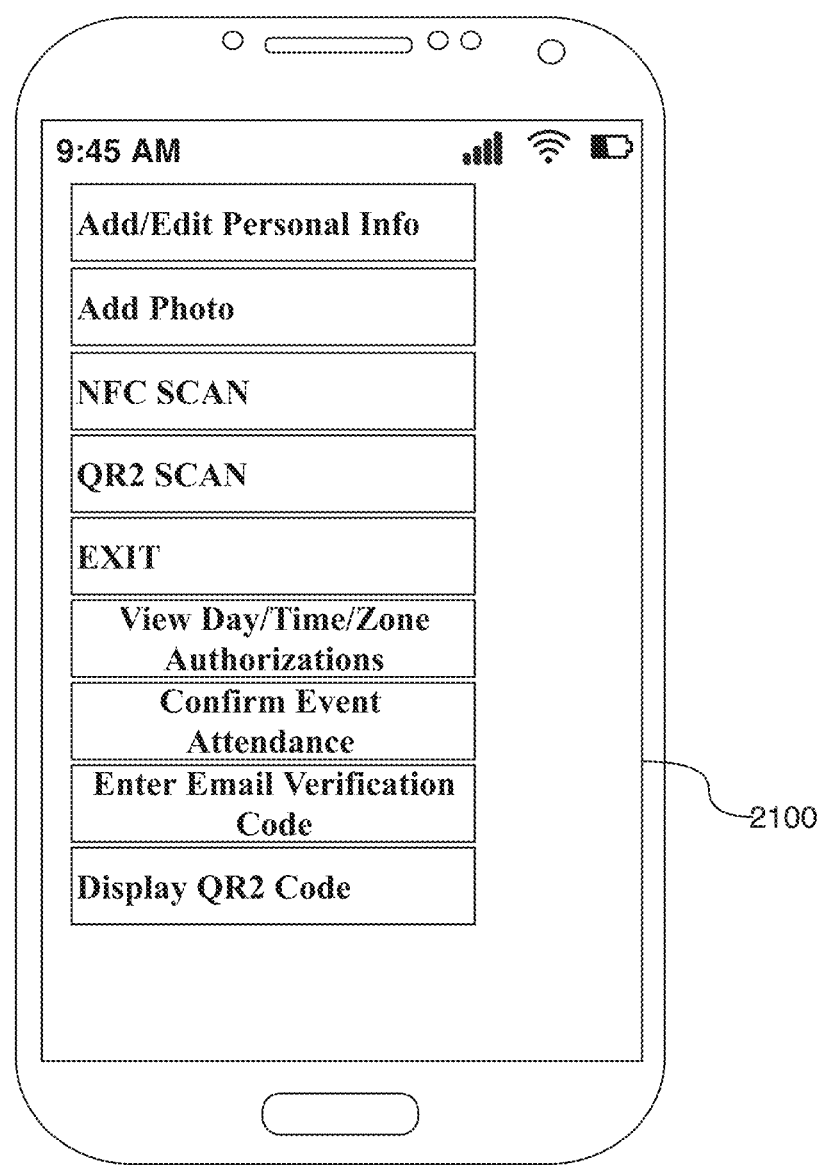
FIG. 21 is a front view of another interface of the system of FIG. 3.

After the event organizer has assigned/associated the above details with a specific wireless wearable, the wireless wearable package is then mailed (unopened) to the event attendee. The event attendee opens the package and reveals the QR2 code inside. The attendee downloads the ATTENDEE version of the mobile device app to their mobile device and uses it to scan the QR2 code. Then, through the app, the event attendee can add and/or edit their personal information, such as name (though in implementations a change of name may be blocked by the event organizer), email, photo, zip code, and birthdate. For example, FIG. 21 shows an example interface 2100 which includes selectors that could be used to access a form for adding/editing personal info for the attendee, scan the QR2 code, scan the NFC code of the wireless wearable, and exit the app.

Since QR1 is associated with ID1, QR2 is associated with ID2, and ID1 is associated with ID2 through the database by the administrator, the event attendee's personal information (name, photo, etc.) are now associated with the event organizer's selected permissions for the guest through the database. And since the NFC/RFID code is also associated with ID2 through the database, when the event attendee then attends the event, a bouncer or event organizer employee/contractor may, using the ORGANIZER version of the mobile app, read the NFC/RFID code of the wireless wearable of the event attendee (using the built-in NFC/RFID reader of the mobile device), and determine whether the NFC/RFID code of the wireless wearable is authorized or, in other words, whether the person is authorized to enter the event and/or a specific zone of the event. The event attendee is then admitted to the event and/or zone or denied admittance, as the case may be.

The batch number, which may be printed on batch-common packaging (on any number of packages of wireless wearables) may be used to associate a full batch of wireless wearables with a specific event organizer through the database. The QR1 code is printed on the wireless wearable package and allows the event manager to do the functionalities described above, associating the specific wireless wearable with a specific attendee through the database using one or more event organizer interfaces either through a mobile app or website interface. The QR2 code, which is inside the package and not visible to the event organizer, is used to allow the event attendee to associate personally identifying information (PII) with the wireless wearable through the database using one or more event attendee interfaces, such as through the attendee version of the mobile app. In implementations the NFC/RFID code could also be used, in addition or alternative to the QR2 code, to allow the event attendee to associate the PII with the wireless wearable through the database using the one or more event attendee interfaces. For example, if the event attendee's mobile phone includes an NFC/RFID reader, then through the event attendee version of the software app the event attendee could scan the NFC/RFID code of the chip in the wireless wearable, and instead of or alternative to scanning the QR2 code, could associate the PII with the wireless wearable through the database using one or more interfaces of the event attendee app using the NFC/RFID code.

The NFC/RFID code of the wireless wearable may be unreadable before the wireless wearable package is opened. This could be done with one or more shielding layers or mechanisms which disallow an NFC/RFID reader from reading the NFC/RFID code of the wireless wearable before the box or package is opened. The ID1 and ID2 codes are associated with one another only through a remote database, so that while the event organizer may assign access rights to the wireless wearable, somebody encountering the wireless wearable in transit (who is not the event attendee) would not be able to change the PII associated with the wireless wearable without opening the package. Other security features may be included, for example the event organizer may email a code to the event attendee and this code may be needed, in addition to the NFC/RFID code and/or QR2 code, for the event attendee to change any of the PII associated with the wireless wearable through the database. As indicated above, the NFC/RFID code is used to verify the event attender's access rights and personal details at the event and/or at an event zone entrance.

The above details of assigning ID1, ID2, QR1, QR2, and NFC/RFID codes to a specific wireless wearable, as well as associating ID1, ID2, QR1, QR2 and the NFC/RFID code with one another through the database may be termed "serialization" of the wireless wearable. Although a method above has been described for the event organizer to assign access rights to individual wireless wearables, the event organizer may, in implementations, also be able to assign access rights to multiple wireless wearables at a time—such as to an entire batch or to an entire series or range of wireless wearables. Assuming, for example, that the batch is numbered in a serial manner (for example the packaging numbering each package as 1/1000, 2/1000, etc.), the event organizer may be able to scan the QR1 code of the first wireless wearable (1/1000) and then scan the QR code of the five hundredth wireless wearable (500/1000), and then assign specific access rights to all those wireless wearables (wearables 1 through 500) at the same time. The event organizer may then assign different access rights to the remaining wireless wearables (wearables 501 through 1000).

There are other ways that the access rights may be assigned. For example, using the one or more event organizer interfaces, the event organizer may not assign access rights to specific wireless wearables but, instead, may assign specific access rights to specific event attendees. The wireless wearables may then be mailed to the event attendees without reference to which attendee needs which wireless wearable. When the event attendee receives the wireless wearable and, using the event attendee app, associates the wireless wearable with himself/herself through the database using the QR2 code and/or the NFC/RFID code, the system then associates the access rights (that are already associated with that event attendee through the database) with this specific wireless wearable that the event attendee has received. This method may allow the event organizer to do the access right assignments through a website interface as opposed to through a software app interface using a mobile device. Table 1, below, summarizes some of the details that have been described above with respect to the serialization of the wireless wearables.

TABLE 1

| Group | Element/Identifier | Editability | |
|---|---|---|---|
| | | Organizer | Attendee |
| Wireless Wearable Identifiers (Assigned by Administrator) | Batch Number ID1 (associated w/ID2 & QR1) ID2 (associated w/ID1, QR2, & NFC/RFID) QR1 (associated w/ID1) QR2 (associated w/ID2) NFC/RFID Code (associated w/ID2) | No (fixed by Administrator) | |
| | Event ID | YES | NO |
| Event Access Attributes | Zone Rights (e.g., access to zones 1 and 3-5 of 10 zones) | YES | NO |
| | Date & Time of Access | YES | NO |
| | Time Period Allowed | YES | NO |
| | Age Limit (e.g., min. event age, or none) | YES | NO |
| Personally Identifying Information | Name (Organizer may block name change by Attendee) | YES | YES/NO |
| | E-mail | YES | YES |
| | Photo | NO | YES |
| | Zip code | NO | YES |
| | Birthdate | NO | YES |

The above use case is described as a "first use" of a wireless wearable, but obviously any wireless wearable could be used more than once. As an example, once the event attendee has already used the wireless wearable, the wireless wearable will already be associated with the attendee's personally identifying information through the database. If the same event organizer wants to authorize the same person for another event, the event organizer can simply add that person to the guest list for the event and edit the attendee's access rights to the new event using the event organizer interfaces. If a different event organizer wants to authorize the person for access to an event, then when the event organizer is adding the person to the guest list the event organizer may be prompted to indicate whether the person is the same person that has attended a prior event and whose information is already in the database. Or, when the event attendee is signing up for the event (such as through a website interface) the attendee may be able to include the attendee's login details or credentials to indicate that the attendee already has a wireless wearable, and the attendee may be able to use that wireless wearable for the second event.

In other implementations the wireless wearable could be a single-use wireless wearable but could serve as a memento of the event. It could, for example, be imprinted with details of the event, or artwork, or the like (for example the name and/or art depicting a concert or event that was attended, a marathon or relay that was run, and so forth), and the wireless wearable may thereafter be worn only as a reminder of the event. In this way the wireless wearable serves both as the mechanism to enter the event and, thereafter, as a memento of the event.

Event Organizer Interfaces

A user computer 326 having a display 328 is shown coupled with the system through the telecommunications network 310, and one or more event organizer interfaces displayed on the display 328 may be used by an event organizer to set up certain relations in the database, such as authorizing a certain user and/or wireless wearable for entrance into an event or location, as has already been described in some detail above. For example, an event organizer may order a plurality of wireless wearables from the aforementioned administrator and then may, through the event organizer interface(s), associate an individual participant (i.e., someone who has paid for an event or who is otherwise authorized to enter some event or location) with a specific wireless wearable through the database. The event organizer may then mail the wireless wearable to the individual participant to be used by the participant to enter the event or location. The event organizer could also authorize users to enter only certain portions of a building or location (for instance a backstage party area) by authorizing a certain user or wireless wearable to only be allowed past certain RFID/NFC readers as chosen by the event organizer. Such authorizations and deauthorizations may be altered through the computing device 326 by the event organizer. Although computer 326 is shown as a desktop computer it could alternatively be a laptop, a tablet, a mobile device, a smart phone, and so forth.

The event organizer interfaces may be accessed through a web application, as indicated, and may enable the event organizer to define a list of attributes (event, zone(s), time(s), PII, one-time entry vs. multiple time entry, alcohol only for those of a certain age, and so forth) and assign these attributes to an entire batch (though this may mean not adding the PII) or to each wireless wearable separately. Through the web application the event organizer may also create or select attributes that can be authorized and/or edited on a mobile device using the event organizer app with respect to individual wireless wearables. The mobile app allows the event organizer to add authorizations to individual wireless wearables by associating those authorizations with the QR1 codes of the wireless wearables, using a QR code reader that is built into the mobile app (or by the event organizer mobile app interfacing with another QR code reader app installed on the mobile device).

There are a few wireless wearable activation modes, some of which have been described previously. The event organizer may authorize/activate wireless wearables by series, assigning the same event attributes to all wireless wearables in a batch. The defining of the authorization details/limits may be done by manually entering the details/limits through the website interface or through the event organizer mobile app. The assignment of which wireless wearables get the authorization can be done by entering the series or batch number through the website interface or by scanning one of the QR1 codes from the batch using the event organizer app and then assigning all wireless wearables, from that batch, the selected authorization details.

The event organizer could alternatively authorize/activate wireless wearables by quantity, by assigning the same event attributes/authorizations to a defined number of wireless wearables. The defining of the authorization details/limits may again be done by manual entering through the website interface or through the event organizer mobile app. The assignment of which wireless wearables get the authorization can be done by scanning the appropriate number of QR1 codes through the event organizer mobile app.

The event organizer could alternatively authorize/activate wireless wearables individually, by assigning different event attributes and personally identifying information to every wireless wearable individually. The event organizer could manually do this through the website interface (such as by assigning authorizations to individual event attendees on the guest list) or through the event organizer mobile app (such as by assigning authorizations to individual wireless wearables after scanning them using the QR1 codes), or alternatively the event organizer could create a list in another program (such as a spreadsheet program) and upload the details in CSV or other format to the database using the website interface to do the individual authorization assignments.

The event organizer interfaces may also allow the event organizer to edit and manage authorizations of mobile devices used by field staff, employees or contractors for events. This may include creating and managing individual staff accounts with hierarchical rights as follows: (1) a minimal level of rights allowing guests to enter selected zones only using primary authorization (i.e., through NFC codes); (2) a higher level of rights allowing guests to enter selected zones using also a backup (QR) authorization method (as this method may be less secure it could be assigned to supervisors only); (3) a higher level of rights allowing guests to enter all zones using all authorization methods; and (4) a highest level of rights with the above rights plus the ability to manage individual staff accounts and rights.

The event organizer interface may also display event logs such as guest verification, staff actions, logins, scans per event organizer staff member, NFC scans of wireless wearables, backup QR scans, and so forth.

Some or all of the above features of the event organizer authorizations and assignments and the like may be done using the event organizer version of the mobile device application instead of or in addition to using a website interface.

As has been discussed to some extent already, some of the above functionalities may be made possible through the use of one or more web servers 312 and the user computer 326 may allow the event organizer access to accomplish the above functions by interacting with the database and/or database server through the web server, or the event organizer could interact with the database and other system elements through an event organizer app that is facilitated by the application server 334.

Figure 12:
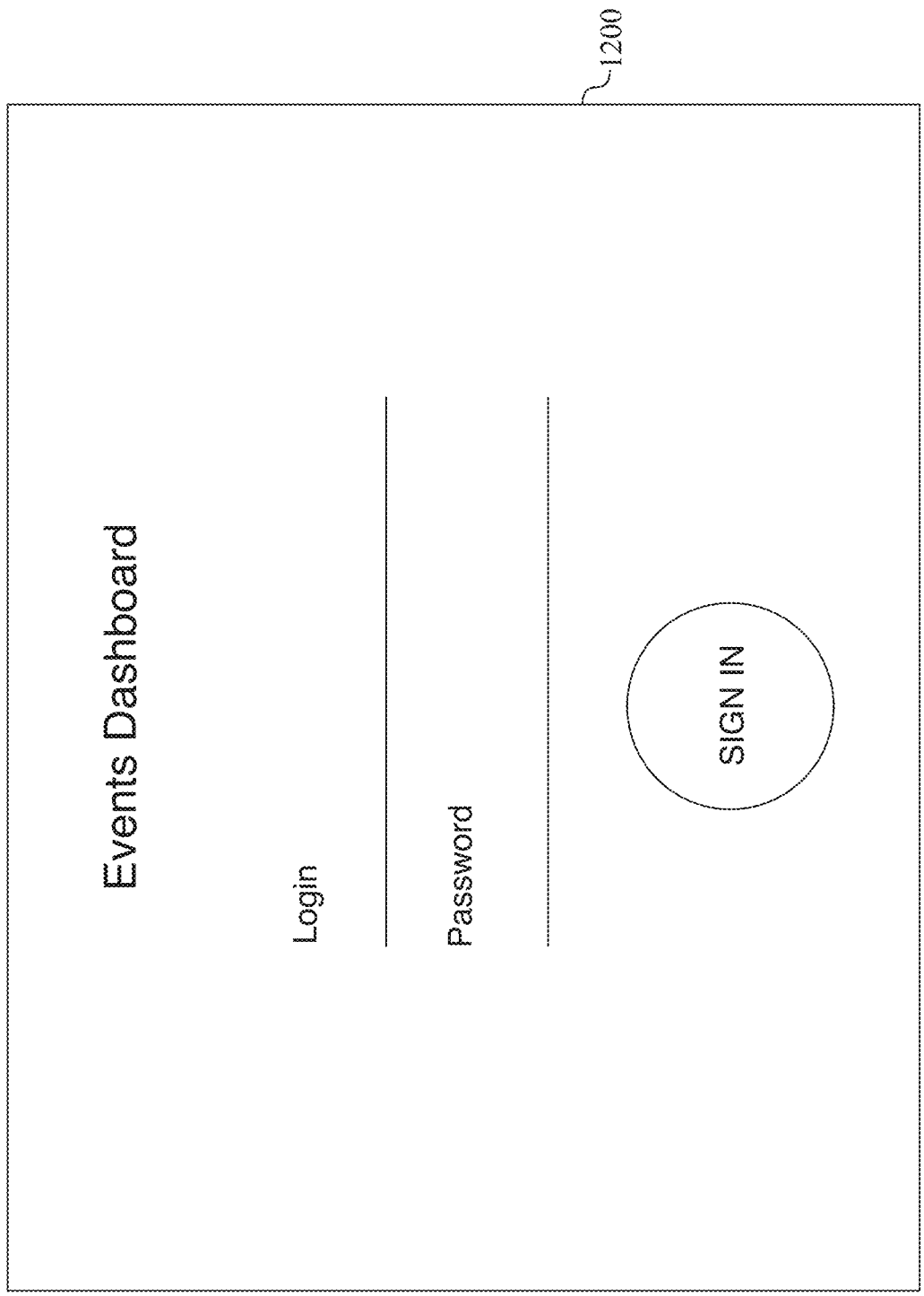
FIG. 12 is a front view of another interface of the system of FIG. 3.
Figure 13:
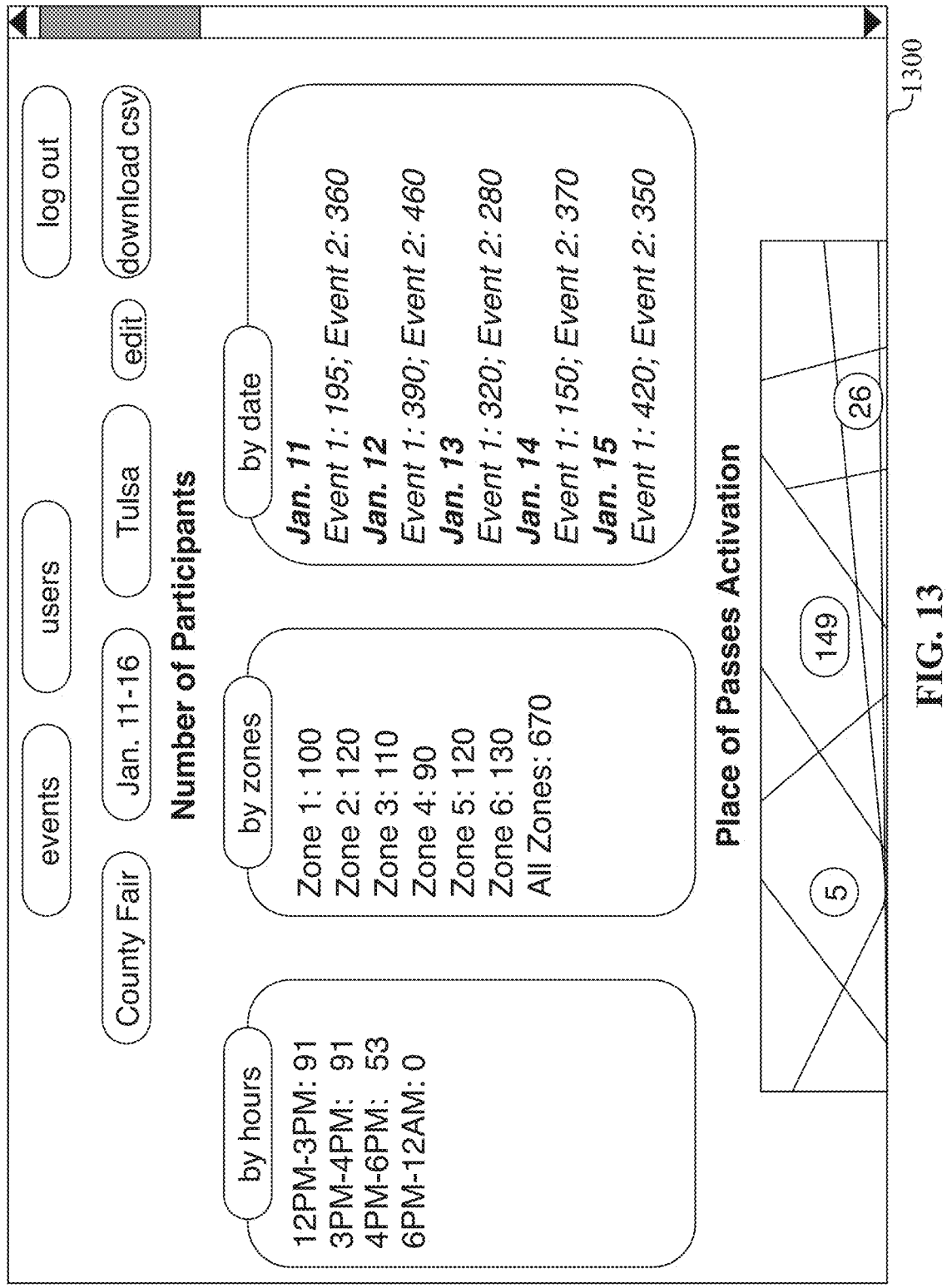
FIG. 13 is a front view of another interface of the system of FIG. 3.
Figure 14:
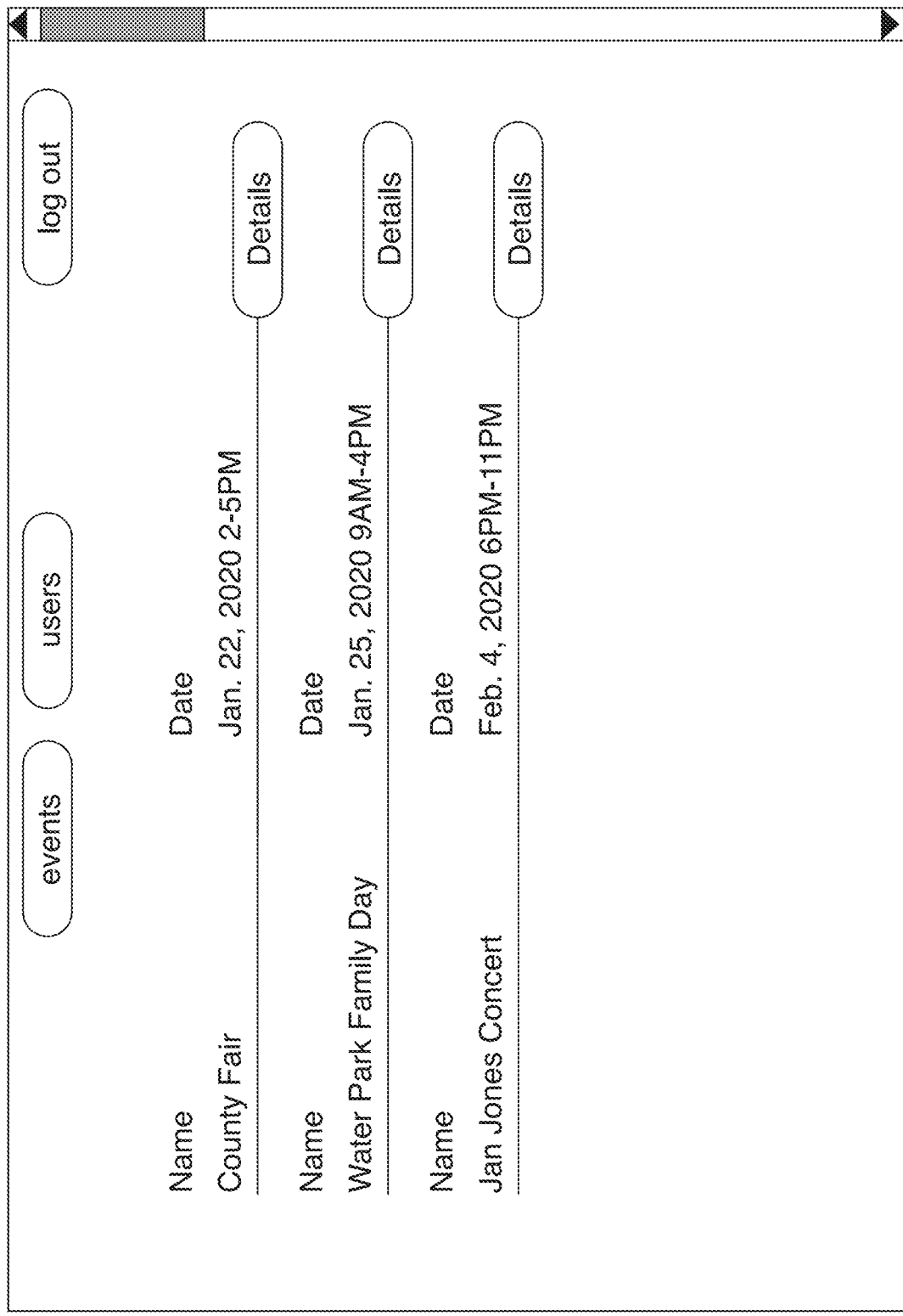
FIG. 14 is a front view of another interface of the system of FIG. 3.

FIGS. 12-19 show representative examples of event organizer interfaces that may be accessed through a website. FIG. 12 shows an interface 1200 which allows an event organizer to login using credentials. FIG. 13 shows an interface 1300 that gives a view of the details related to one event. In this case the event is a county fair and interface 1300 allows a view of the number of participants by certain categories, such as participants by time ranges, participants by zones, and participants by date. In this example the county fair includes two sub-events, event 1 and event 2. This could be, for example, different areas of the fair that are available with different ticketing details (such as a carnival portion and a waterpark portion). Interface 1300 also includes a map showing activation locations (these could be zone entrances where participants/attendees have checked in). As can be seen, 5 participants have checked in at one location/zone, 149 at another location/zone, and 26 at another location/zone. The number of participants by hour, by zones, and by date are here shown as simple lists, but in implementations these could be shown as graphs, such as a pie graph for entries by hour, a bar graph for entries by zone, and so forth.

Figure 15:
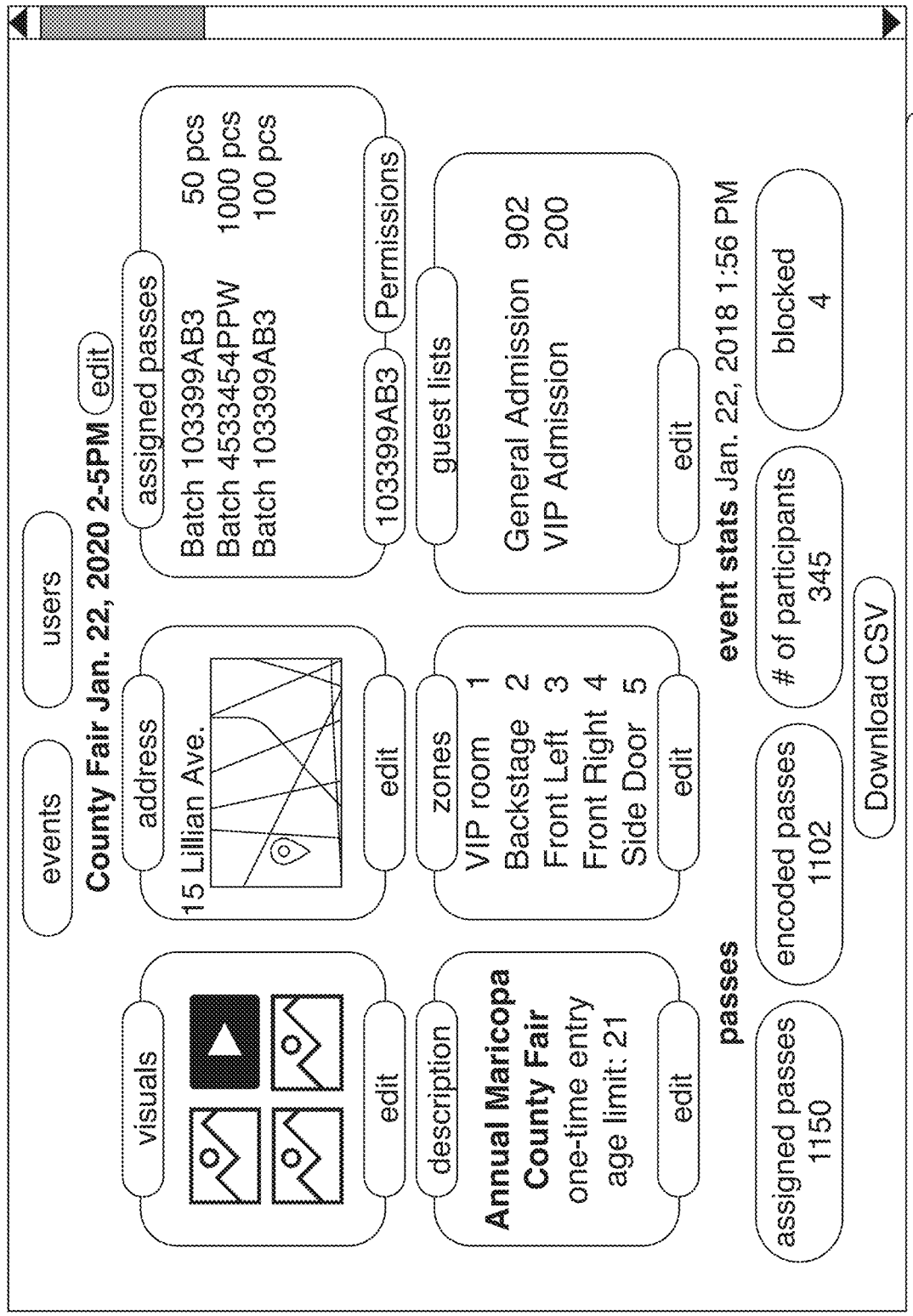
FIG. 15 is a front view of another interface of the system of FIG. 3.
Figure 16:
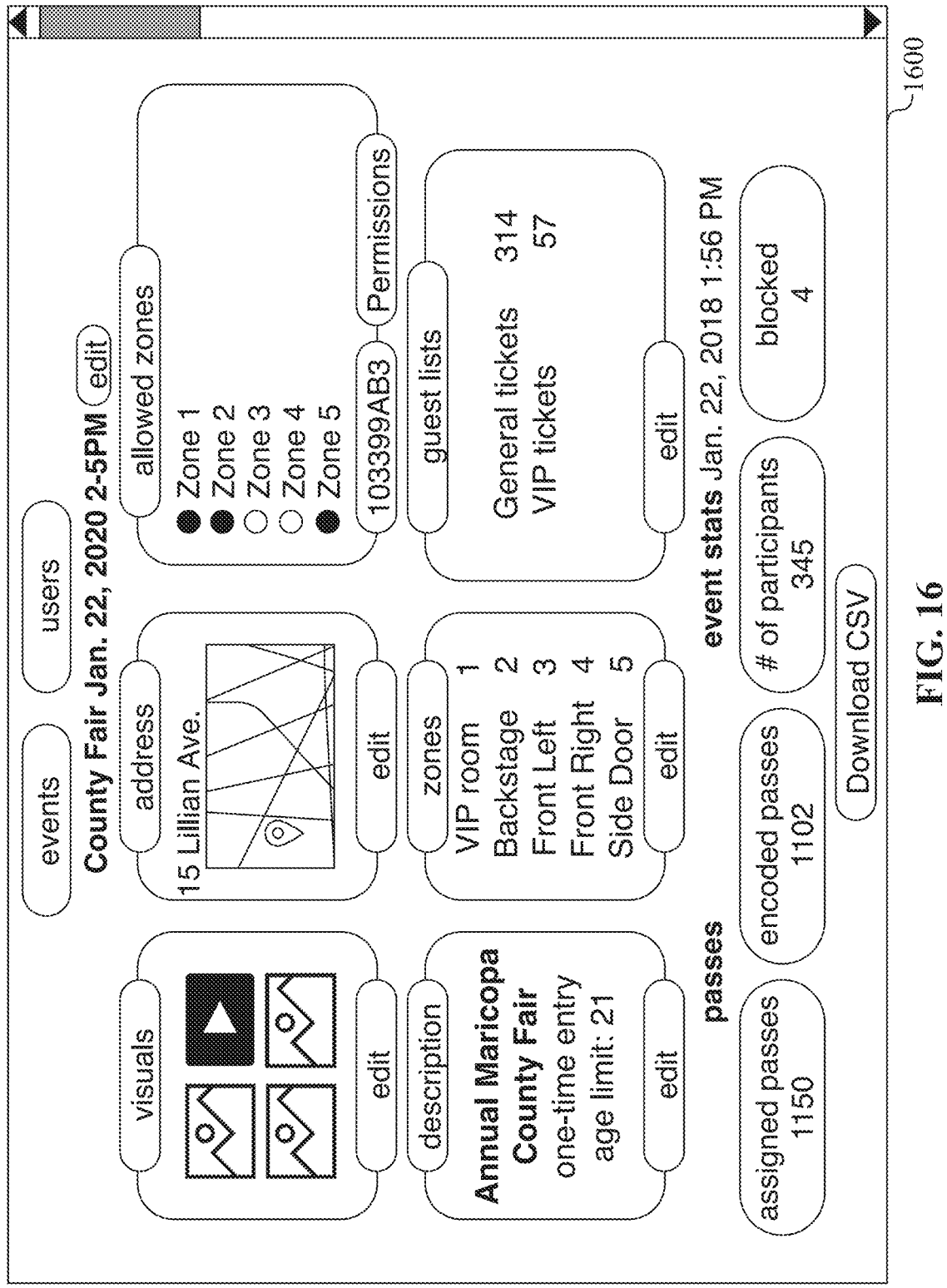
FIG. 16 is a front view of another interface of the system of FIG. 3.

It also can be seen that there are a few selectors on interface 1300 including an events selector, a users selector, a log out selector, and a download CSV selector. The log out selector may be selected to log the user out. The download CSV selector may be selected to download the details and statistics of this event in CSV format. The events selector may be selected to bring up interface 1400 of FIG. 14, which shows a list of all events for this event organizer, including a name and date/time, and by pressing the details selector on this page an interface similar to interface 1300 may be viewed for each event. There is also an edit selector on interface 1300, and when this selector is selected interface 1500 of FIG. 15 is shown, which allows the user to edit the name and date/time of the event (by further selecting the edit selector to the right of the name/date/time), visuals related to the event (including videos and photos/drawings) which may be shown to end users when registering for an event, an address of the event, the number of assigned passes, a description of the event (including age limit, if any), zone designations for various zones (for example in this implementation the VIP room is designated zone 1, backstage is designated zone 2, a front left entrance is designated zone 3, a front right entrance is designated zone 4, and a side door is designated zone 5.

From this interface the guest lists can be edited as well, as described to some extent above. As can be seen, the event organizer has created a General Admission guest list of 314 people and a VIP guest list of 57 people. The event organizer can edit the guest lists through the edit selector such as by adding guests or removing them. An overall guest list (all guests/attendees for all events) may be visible on another interface, but is not shown in the drawings.

The assigned passes section shows the various batches for this event and the number of pieces per batch, as well as the batch number. As indicated previously, the batch number may be assigned by the administrator before the event organizer receives the batches. The bottom left indicator indicates which of the batches is selected, and if the user selects the Permissions selector the interface changes to appear as interface 1600 of FIG. 16, wherein the assigned passes section changes to allow the user to edit permissions by batch, in the shown example the selected batch is being edited so that the wireless wearables of this batch by default allow entry to zones 1, 2 and 5. Referring back to FIG. 15, the bottom left section shows the number of passes that have been assigned (i.e., batches that have been assigned and sent to the event organizer for this event) and the number that have already been encoded (in other words, those that have already been received by the participants and activated). The event stats section shows that, as of the date and time shown, 345 participants/attendees have already participated in the event and four participants have been blocked.

Figure 22:
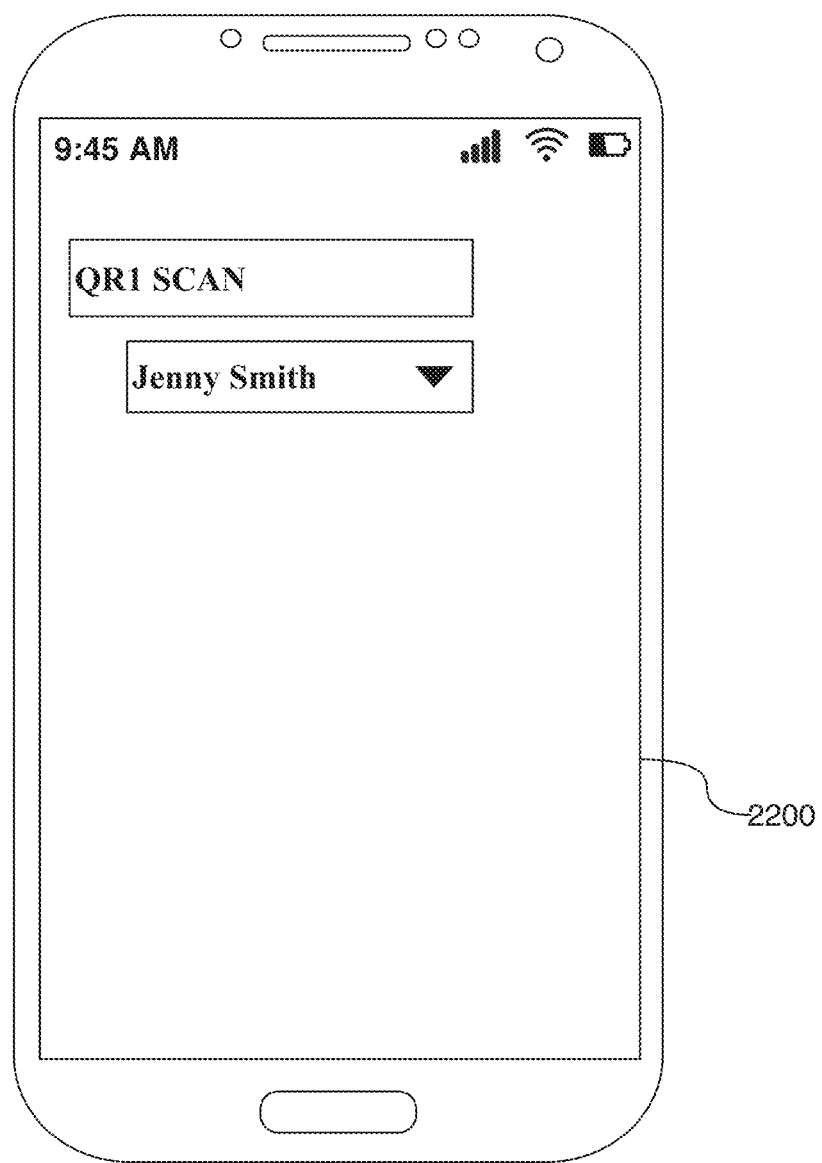
FIG. 22 is a front view of another interface of the system of FIG. 3.

Although not shown in the drawings, if a user selects "edit" on the guest list section a guest list interface is shown which shows the name of the event, the name of the guest lists for the event, and the date each guest list was created, as well as an indicator of whether any guest list is closed for encoding. From this interface the user can add a new guest list, edit an existing list, or delete an existing list. The use can also select a "details" selector to bring up the guests for any specific guest list. This list shows the participant names, emails, and allowed zones as selected by the event organizer. This list/interface may also allow the event organizer to associate a QR1 code with each guest, by scanning the QR1 code using a device attached to a computer accessing the website. Alternatively, the event organizer could use the organizer version of the mobile app. For example, interface 2200 of FIG. 22 may allow the event organizer to scan a QR1 code (by selecting the QR1 Scan selector) and associate it with a specific event attendee (for example by selecting the attendee from a dropdown menu or from one or more predictive text options while inputting the person's name). Discussing again the guest list interface(s), the event organizer can edit any of the information thereon as desired for any individual guest by selecting an "edit" selector. From this interface the event organizer can also select an "Import from XLS/CSV" selector to generate a new list (or add to an existing list) using an existing spreadsheet or CSV file. On this interface there is also a "Close list for encoding" selector that the event organizer may select to close the list to edits while the QR1 codes are being activated, as described previously. From this interface the user can also edit the guest list name.

Returning to FIG. 15, there is a Download CSV selector that a user may select to download a CSV file including details of the event.

Figure 17:
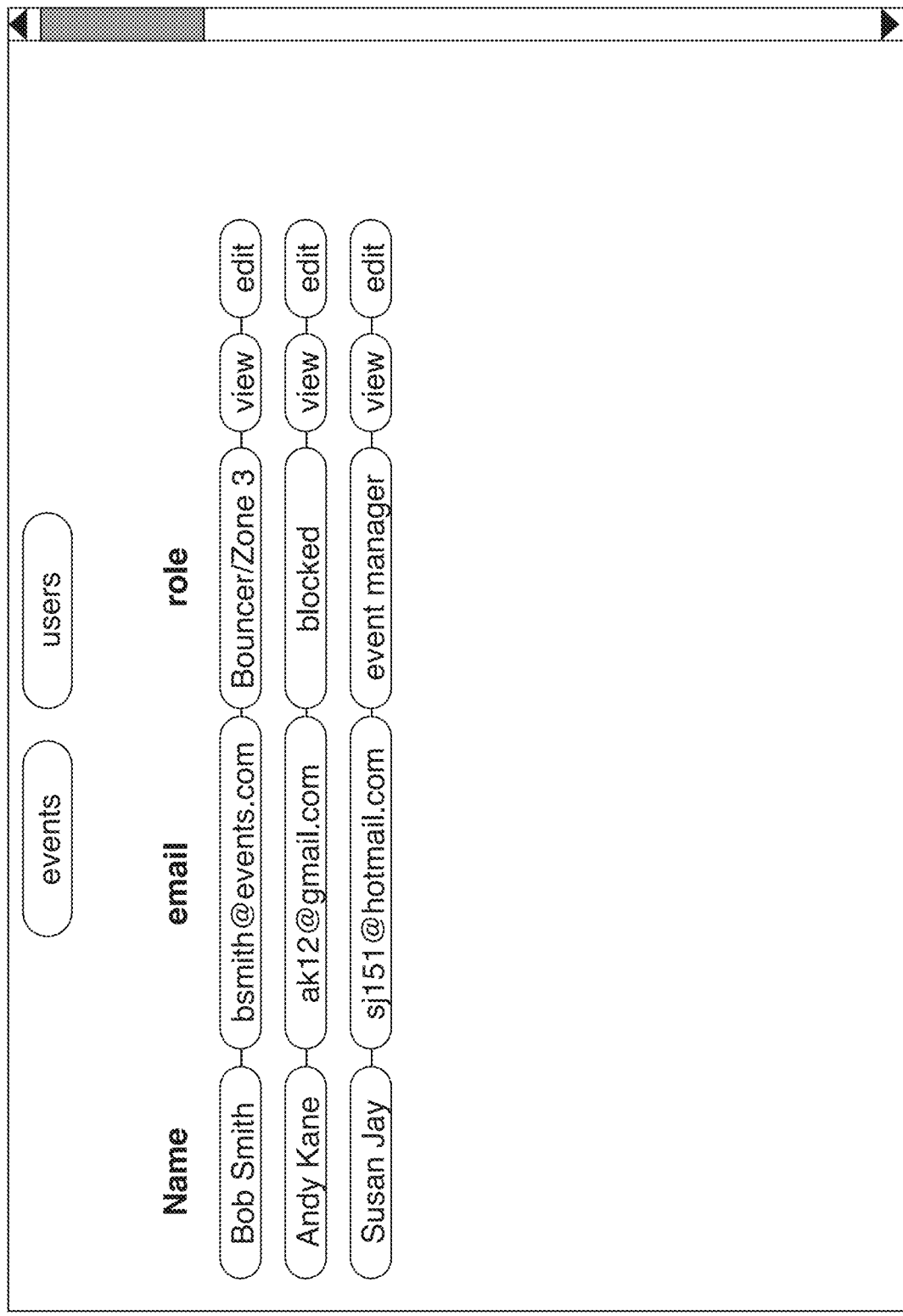
FIG. 17 is a front view of another interface of the system of FIG. 3.
Figure 18:
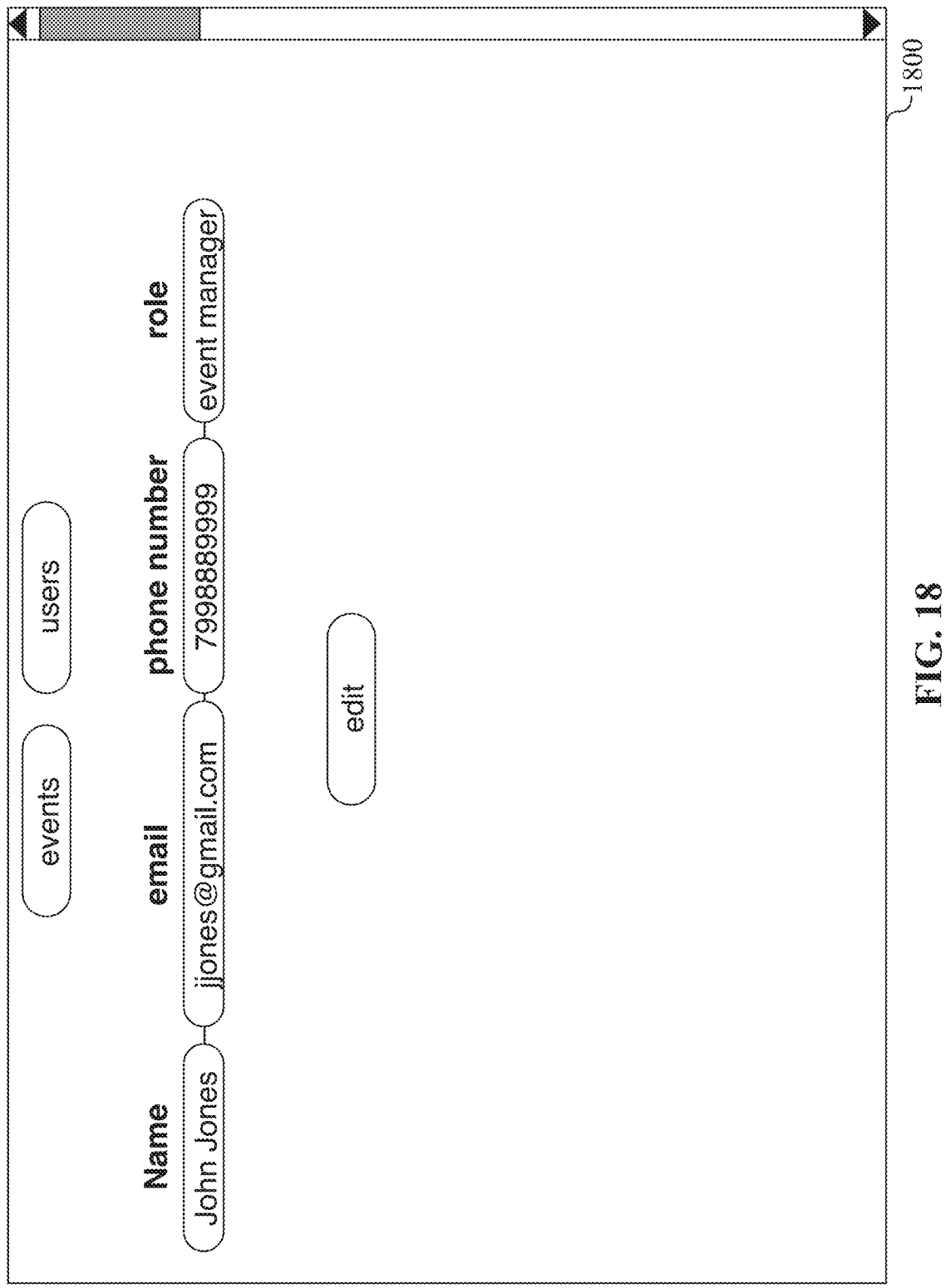
FIG. 18 is a front view of another interface of the system of FIG. 3.
Figure 19:
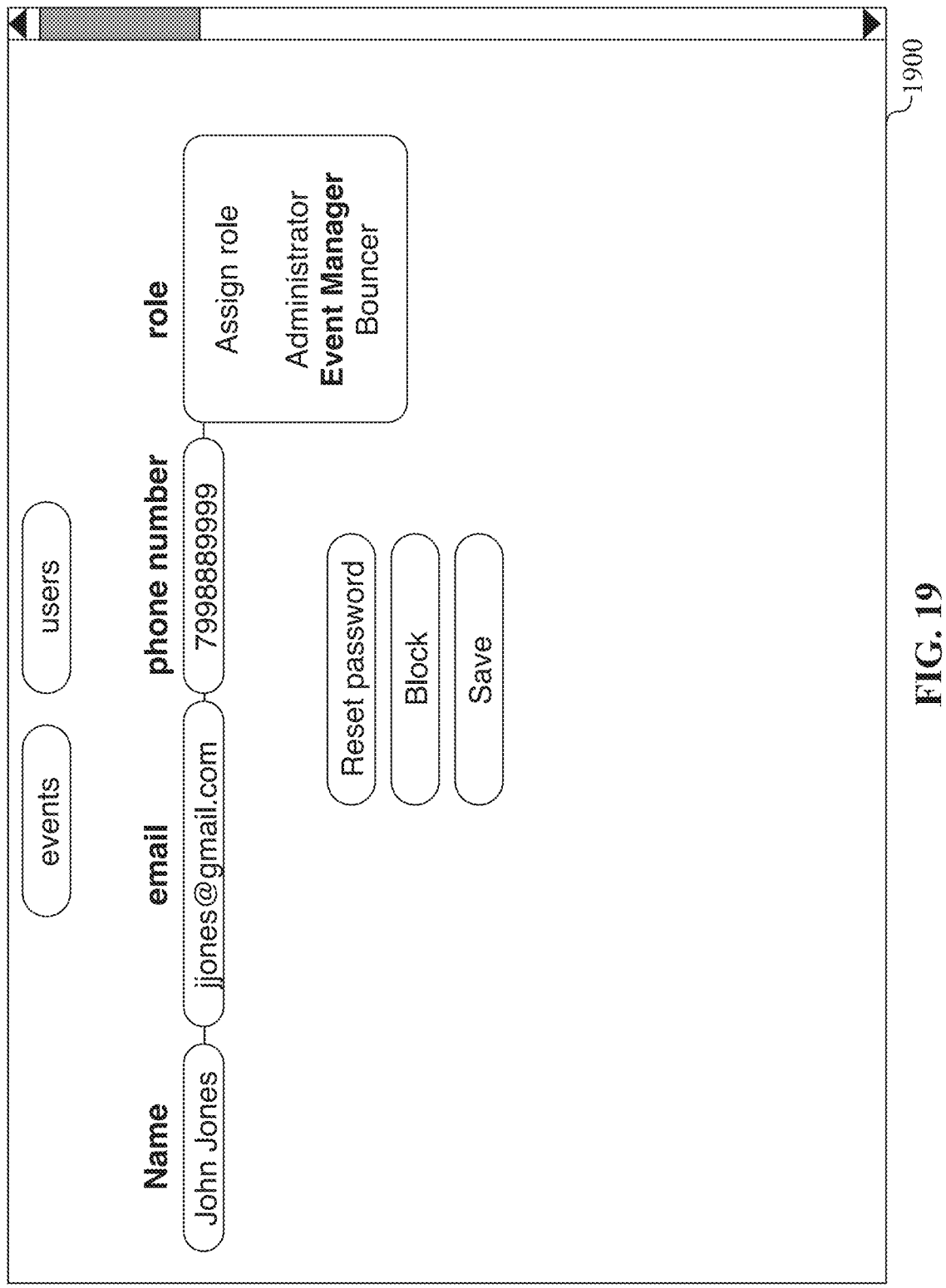
FIG. 19 is a front view of another interface of the system of FIG. 3.

When an event organizer selects the "users" selector, interface 1700 of FIG. 17 is shown. From this interface the organizer can see all the employees/contractors of the event organizer, their names and email addresses (which may be their individual login credentials for logging into the event organizer app), the roles (the representative examples shown are event manager and Bouncer/Zone 3), view selectors and edit selectors. One of the users is seen to have the role of "blocked" which means the event organizer has selected this user as not having an authorized role for this event. If the organizer selects the view selector of interface 1700 then interface 1800 of FIG. 18 is shown, which may show additional details (in this example it shows the phone number). If the organizer selects the edit selector from interface 1700 or 1800 then interface 1900 of FIG. 19 is shown, which allows the event organizer to reset the user's password, edit the name, email, phone number or role of the user (which may be selected from a dropdown list elsewhere populated by the event organizer on another interface), or block the user from having an authorized role in this event. The organizer may select the Save selector to save the edited details to the one or more databases.

End-User Mobile App

The mobile app for the end user (event attendee) may have several features. Through the mobile app the event attendee may, using the mobile device's NFC/RFID and QR scanning capabilities, perform NFC/RFID and/or QR scans. The event attendee may also add or manage/edit the attendee's email address, name and surname (if allowed by the event organizer), zip code, birthdate and photo. In implementations the app may utilize one or more image and/or character recognition algorithms to, for example, automatically recognize a photo (such as on a driver's license or passport or other identification), upload it, automatically detect a user's identifying information from an identification card or passport, and automatically fill in a form (which the user may edit as desired). The app may allow the event attendee to see the attendee's authorizations and to accept terms and conditions and/or view permissions as desired. The app may allow the user to confirm the user's expected event attendance. A menu with selectors allowing the end user to fulfill the above functions is shown by interface 2100 of FIG. 21.

The mobile app may also allow various security and authentication features. The mobile app may allow email loop verification (for example, upon first activation by the attendee a verification email may be sent to the email address on record for the attendee so that the activation does not complete unless the user clicks on a link in the verification email or, otherwise, enters a code from the verification email through the mobile app as indicated on FIG. 21). The mobile app could utilize a facial recognition algorithm (or native facial recognition features of the mobile device itself) to verify whether a photo submitted by the end user is a valid photo (in such a situation biometric data may not be stored by the system, for privacy reasons). As indicated above, the mobile app may not allow the attendee to change the attendee's name if the event organizer has blocked this feature (such as for events with a strictly personalized guest list). The mobile app may block name and photo changes during the event time to protect against multiple people entering with the same wireless wearable in turns. The mobile app may also allow the end user to block use of the wireless wearable to enter the event (or to enter certain zones) if the end user has lost the wireless wearable.

The QR2 code may be used as a backup entry authorization method if the wireless wearable is lost or damaged. The QR2 code may be displayed on the mobile device screen through the mobile app to be presented on event/zone entry. In implementations this feature may be hidden to end users, or it may otherwise only function after being unlocked using a pin code unique to the given event that is entered by an employee/contractor of the event organizer, to avoid fraud.

In implementations when the end user receives the wireless wearable in a sealed box only the event and zone details (and/or the user's information input by the event organizer) may be associated with the wireless wearable. The end user unpacks the package to reveal QR2 and removes the NFC/RFID shielding foil. The user then scans the QR2 code or the NFC/RFID code. If the end-user app is not installed the scanning of the QR2 code or NFC/RFID code redirects the user to download the app (which may be installable on any mobile operating system such as ANDROID, IOS, WINDOWS MOBILE, BLACKBERRY, and so forth). The mobile app then allows the user to fill in personalized information using an in-app form, add a photo using a camera of the mobile device, and so forth. When the user submits the one or more forms the PII is stored in the one or more databases. Later, at the event, the user brings the wireless wearable in close proximity with the NFC/RFID reader (which may be a "tap" of the wireless wearable on the NFC/RFID reader device) (which reader may be an event organizer tablet or mobile device using the event organizer app) when entering/leaving an event/zone. The tapping or checking in at entrance/exit allows the user multiple entries for the same event as needed (though this feature could be optional, as determined by the event organizer). When a user uses the wireless wearable to enter/exit an event or a zone the reader used to authorize entrance/exit may send a signal through the telecommunications network to log the interaction in the database for record keeping and the like for the event organizer and/or administrator to view.

FIG. 3 shows a computing device (mobile device) (attendee computing device) 314 of the event attendee as a part of the system 300, having a display 316 and audio input/output 314 which the end user may use to perform the above functions. Naturally, as there may be many event attendees at any given event, there may be many mobile devices 314 as a part of any given system 300. Although the examples herein describe users inputting information through tactile interaction with one or more visual interfaces, in implementations one or more audio commands/inputs could be used to input information through the one or more interfaces.

Event Organizer Mobile Checkpoint Interfaces

The system 300 may include one or more NFC/RFID readers which send interrogating signals to wireless wearables and receive response signals. The NFC/RFID reader shown in FIG. 3 is a tablet (checkpoint device) 320 having a display 322 and an audio input/output 324, the tablet having the event organizer app installed thereon. The mobile tablet is shown only for illustrative purposes for describing the use of the system with a mobile software application downloaded to the mobile tablet—in implementations one or more standalone readers, that are configured only to function as NFC/RFID readers, may be used, or a mobile phone or other device could be used. As there may be several event organizer employees/contractors stationed at various event/zone entrances/exits, there may be several devices 320 as a part of any given system 300.

In implementations in which wireless mobile phones or tablets or the like are used for the device 320, the aforementioned event organizer mobile app may be installed thereon and may be used to initiate the sending of an interrogating RF/NFC signal to the wireless wearable. The wireless wearable then sends a response signal (the interrogating and response signals both illustrated with NFC/RF signals 332), which the mobile device then communicates to the database server or database (or an application server which in turn communicates with the database) to determine, by querying the database, whether there is a match (or, in other words, whether the person wearing the wireless wearable is authorized to perform some function or enter an event or zone or the like). If a match or authorization is found this is then communicated back to the mobile device and displayed on the display, and the person or the transaction is allowed to proceed. Interrogating and response signals 332 are also shown in FIG. 3 between the wireless wearable and the end user's mobile device, and this is meant to representatively illustrate the situation where the end user uses a reading of the NFC code of the wireless wearable to begin the activation process, described previously.

Figure 9:
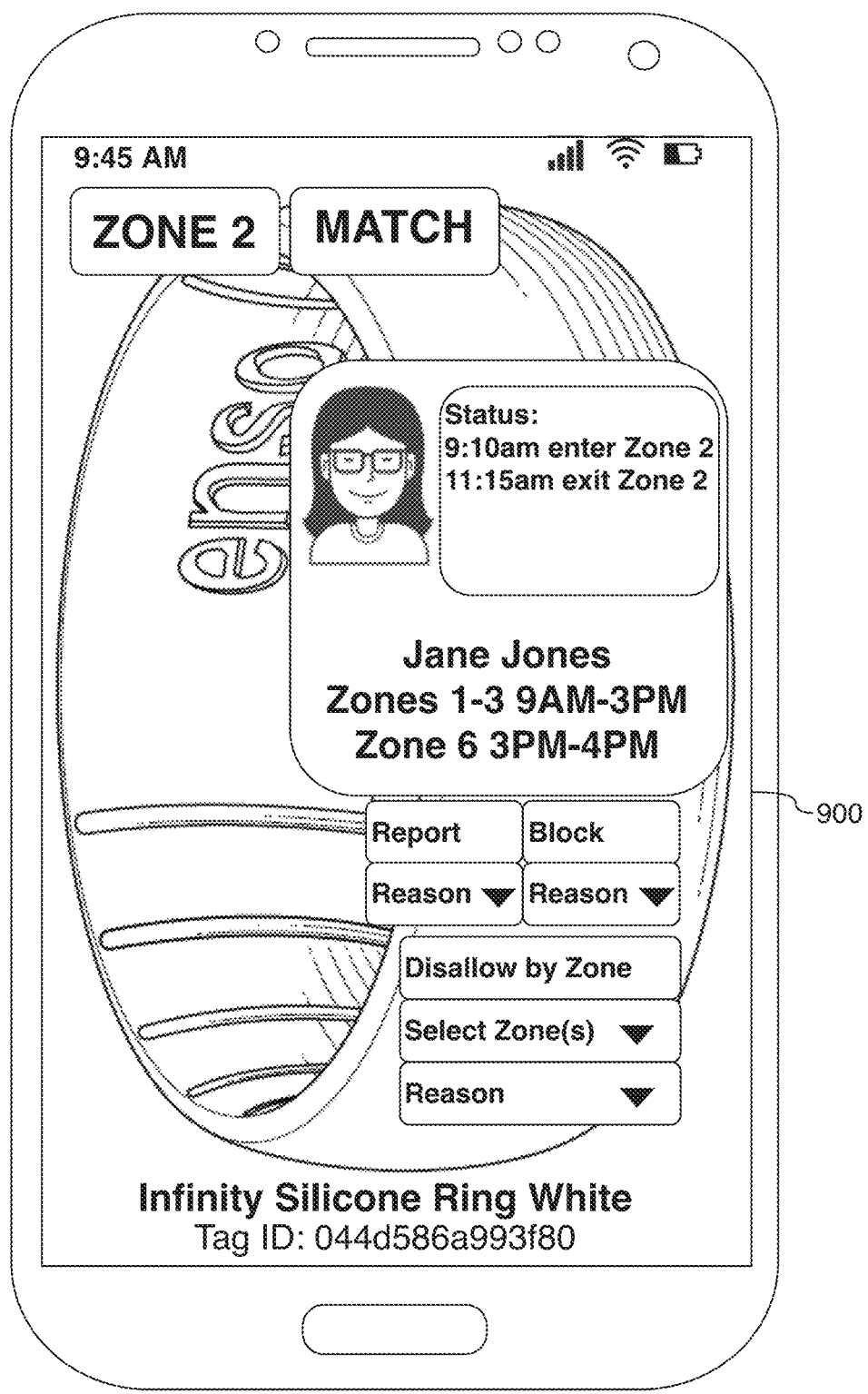
FIG. 9 is a front view of another interface of the system of FIG. 3.

The event organizer app on the mobile devices used as checkpoints may allow the event organizer staff/contractor to log in. The app features may then adjust based on individual user rights as set by the event organizer. The app allows NFC/RFID scans, as a primary verification method, as previously described. When a scan is done this may display the attendee name and photo, as seen in FIG. 9. It may also display event activity status (previous entry/exit times and locations) to eliminate fraudulent entries. The mobile app may also allow reporting actions by the event organizer staff, such as listing an attendee as "Not Allowed Entry" into a specific entry location/zone plus a reason, such as a photo not matching, multiple entries logged for the person without a logged exit, a breach of the rules of the event, the guest not having access rights to the specific zone, and so forth. The mobile app may also allow the event organizer staff to block a guest entirely (disallow them entry at all checkpoints) for a variety of reasons. As indicated above, the mobile app may allow the event organizer staff to do a QR scan of QR2 as a backup verification method. The mobile app also logs guest scans and staff activities and sends these to the one or more databases for storage therein.

Figure 11:
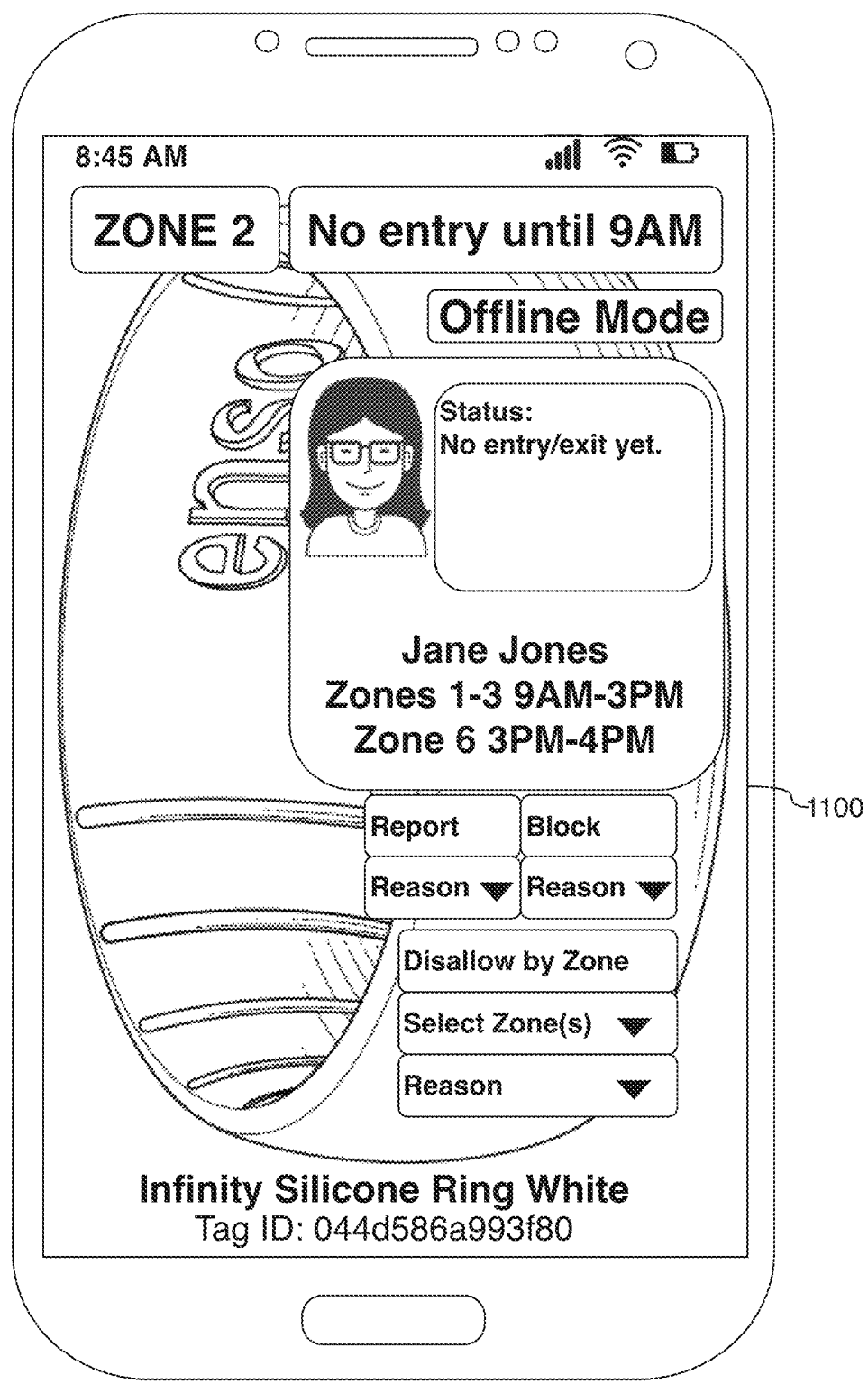
FIG. 11 is a front view of another interface of the system of FIG. 3.

In implementations the event organizer app may be used on a mobile device in an offline mode at an event. This may allow some functionality of the mobile checkpoint by allowing a download to the mobile device of those portions of the remote database data that is relevant for the event and for checkpoint authorization. This allows the mobile device to operate as a checkpoint device even if the WiFi or mobile connection is lost. In this mode the app may check occasionally for WiFi or mobile connection functionality and, if functional, may regularly update the data. The offline operation mode may activate automatically when the connection is lost, and one or more of the interfaces may indicate this, as in FIG. 11. Features such as blocking a user or checking out of a guest may not work in the offline mode, but the mobile device may upload event guest activity records (such as NFC/RFID and/or QR scans) to the remote database(s) automatically once the connection is reestablished. The offline mode may include various other features to add functionality and security (or to mitigate any potential loss of functionality or security) to the system.

Figure 5:
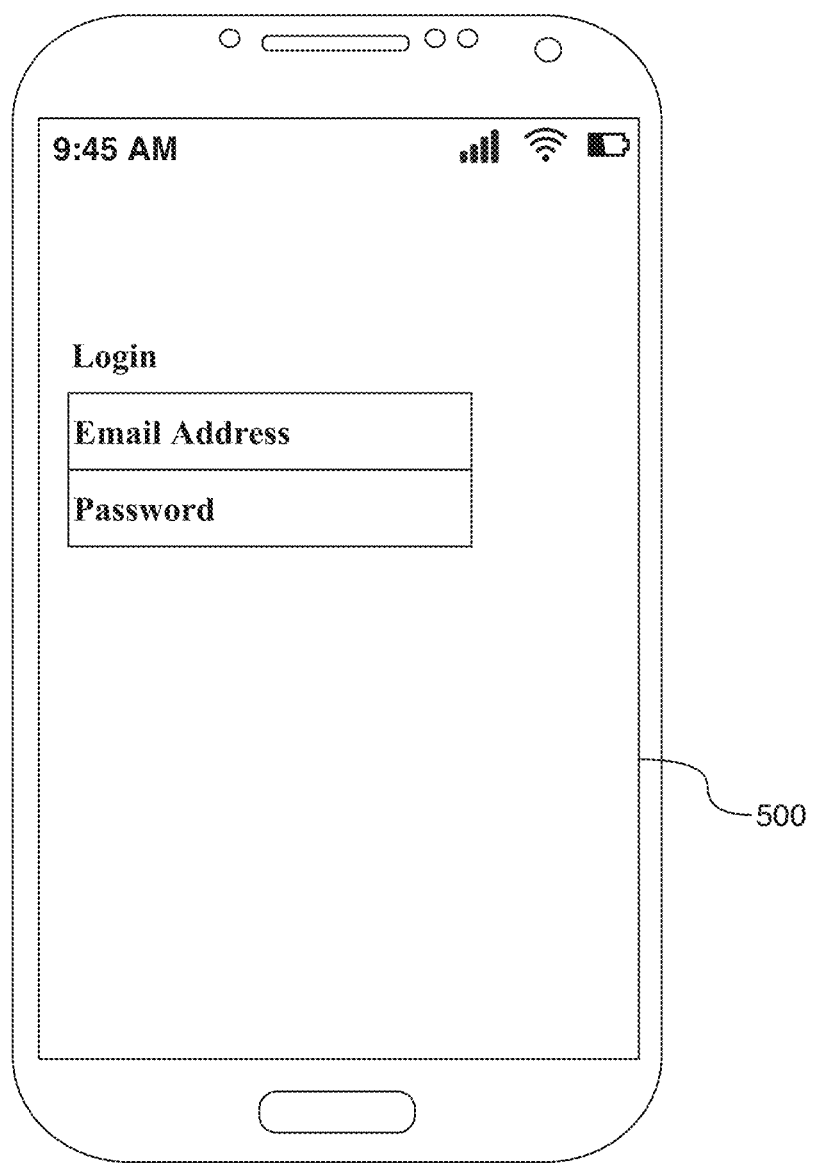
FIG. 5 is a front view of another interface of the system of FIG. 3.
Figure 6:
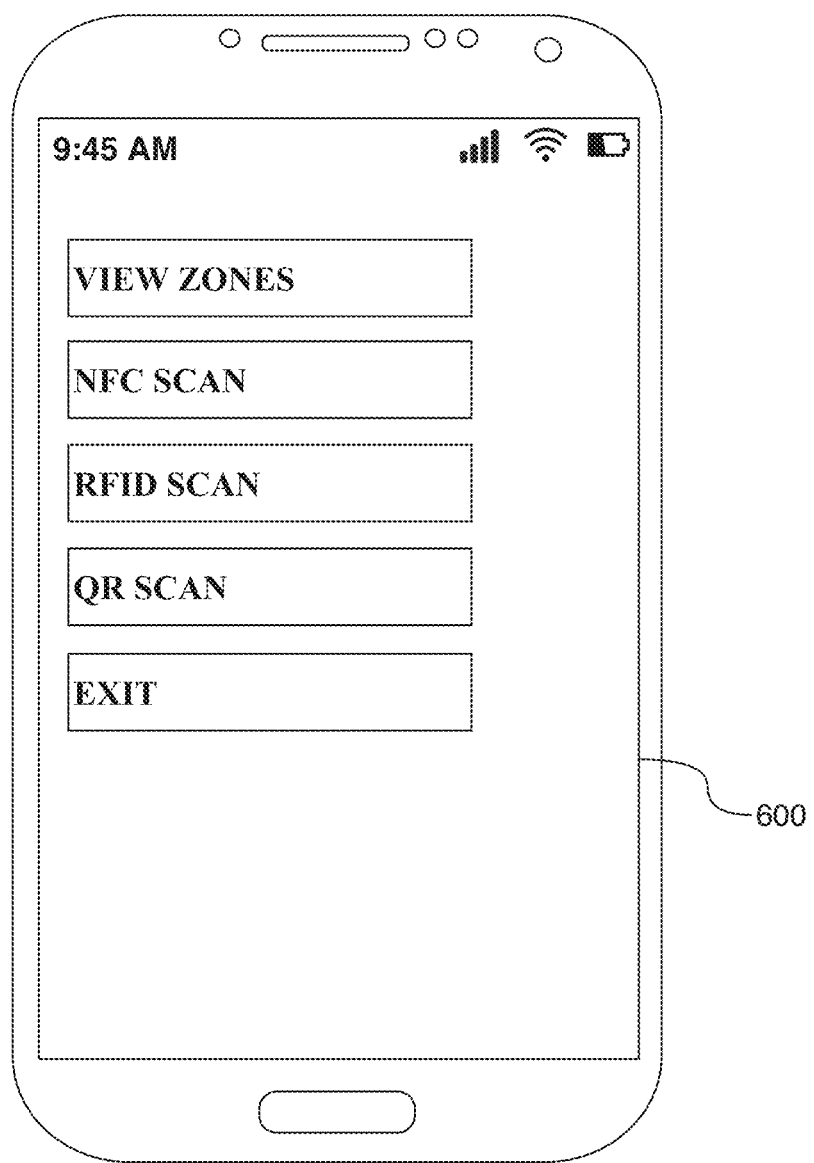
FIG. 6 is a front view of another interface of the system of FIG. 3.

Sample user interfaces for the mobile checkpoint functionality as used on the mobile devices will now be described in more detail. As previously described with respect to interface 400 of FIG. 4, there could be a number of mobile apps that are used by different parties to implement the system, one of which may be an ORGANIZER (or event organizer) app, and upon opening/running this app the employees/contractors of the event organizer may need to log in as illustrated with interface 500 of FIG. 5 (in the example the logging in is done with an email and password, though other credentials could be used in other implementations). Upon logging in, the system features that are permitted/designated for that employee/contractor are loaded/shown. A menu such as that shown in interface 600 of FIG. 6 may be displayed. In the representative example the employee/contractor may select a selector to view zones of the event, to perform an NFC scan, RFID scan, or QR scan, or to exit the application. Other menu items may be available depending on the permissions or hierarchy level of the employee/contractor, such as checking out of one zone and checking into another zone, or in other words switching zones, and so forth.

Figure 7:
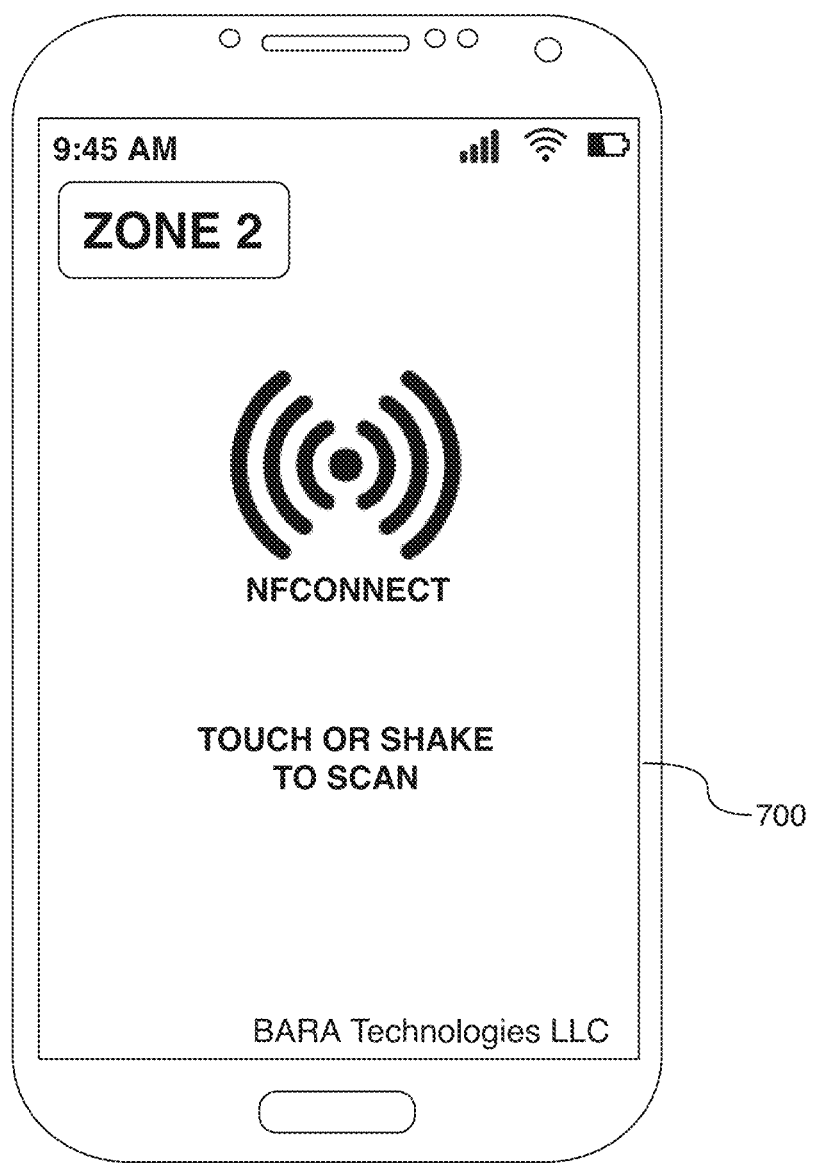
FIG. 7 is a front view of another interface of the system of FIG. 3.

The employee/contractor may select an NFC scan and this may bring up interface 700 of FIG. 7 which is a scan interface. The screen may be touched, or the device shaken, to begin a scan. If an attendee is present with the attendee's wireless wearable the attendee could, at this point, touch the wearable to the screen (though in other implementations the scan could occur simply upon bringing the wireless wearable in close proximity to the screen). The logo element above NFCONNECT may be located in a place to indicate where the user could touch the wireless wearable to the screen or otherwise locate the wireless wearable so as to be in closest proximity with the NFC reader of the mobile device. An indicator is also shown indicating the zone that the employee/contractor is located at. In implementations, depending on the hierarchical permission level of the employee/contractor, the zone indicator could be tapped to bring up an interface or window to change the zone.

Figure 8:
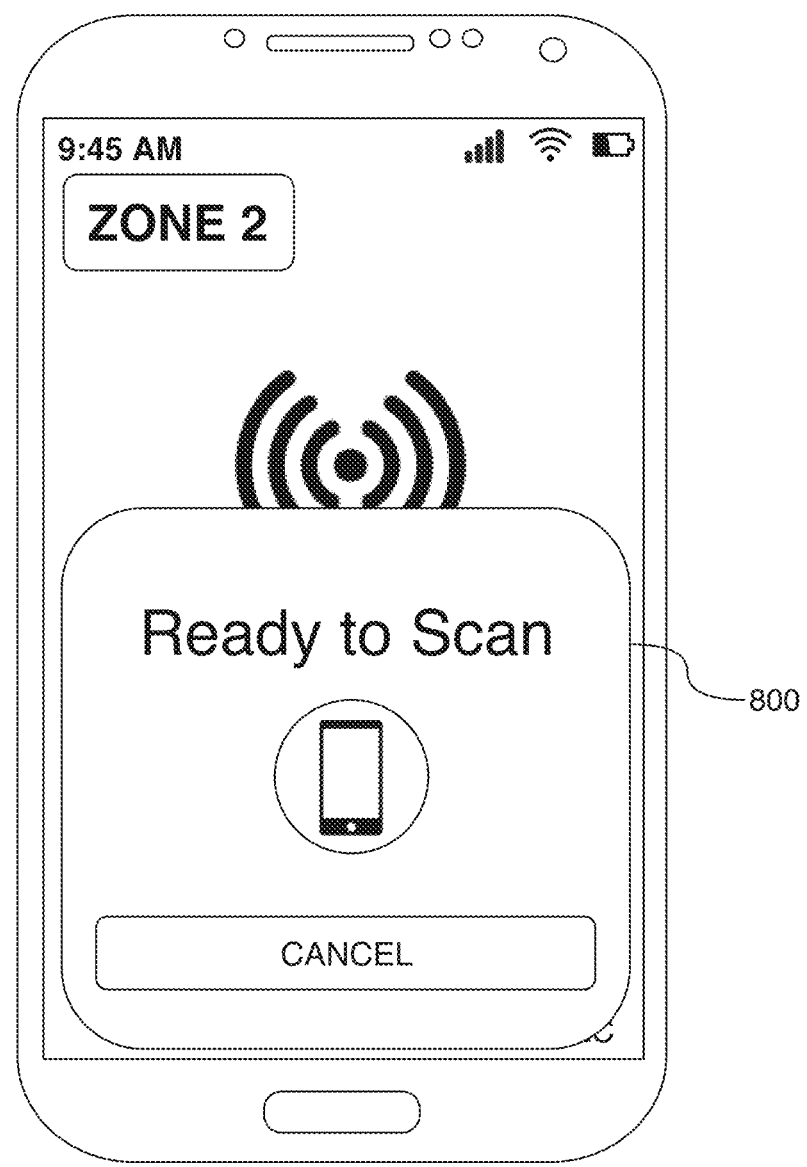
FIG. 8 is a front view of another interface of the system of FIG. 3.

In implementations interface 700 is a preliminary interface that does not begin a scan (in other words does not send an interrogating signal) until an employee/contractor first taps or shakes the mobile device, and in such implementations an interface like interface 800 of FIG. 8 could be brought up once the user does the tap or shake, though in other implementations interface 800 could be skipped. When interface 800 is used, it indicates that the mobile device is sending an interrogating signal (which may be repeatedly sent for some predetermined amount of time if no response is received or until a response signal is received, whichever is sooner).

If a match is determined after the response signal is received and after querying the database for a match using the response signal (such as by the response signal containing the NFC code and the system querying the database to see whether that NFC code is associated through the database with an attendee permitted in this zone at this time), a user interface such as interface 900 of FIG. 9 may be shown, which shows an image of the type, color and ID (which could be ID1 or ID2 or some other ID) associated with the particular wireless wearable (in this case an INFINITY Silicone Ring having a white color), along with a photo of the person previously uploaded to the database, along with the name of the person, the zones and times of allowed entry, the previous entries/exits, and so forth. In other implementations more or fewer items could be shown. The photograph of the person allows the employee/contractor to ensure that the photo uploaded to the database is the person actually seeking entry, and if the picture does not match the entrant the person may be denied entry. Interface 900 may indicate that there is a match, may include options to report a person and give a reason (such as from a dropdown menu and/or using a free text entry), may include a block selector to block a person and give a reason (such as from a dropdown menu and/or using a free text entry), and may include an option to disallow the person from specific zones and give a reason (such as using dropdown menus and/or using free text entries).

Figure 10:
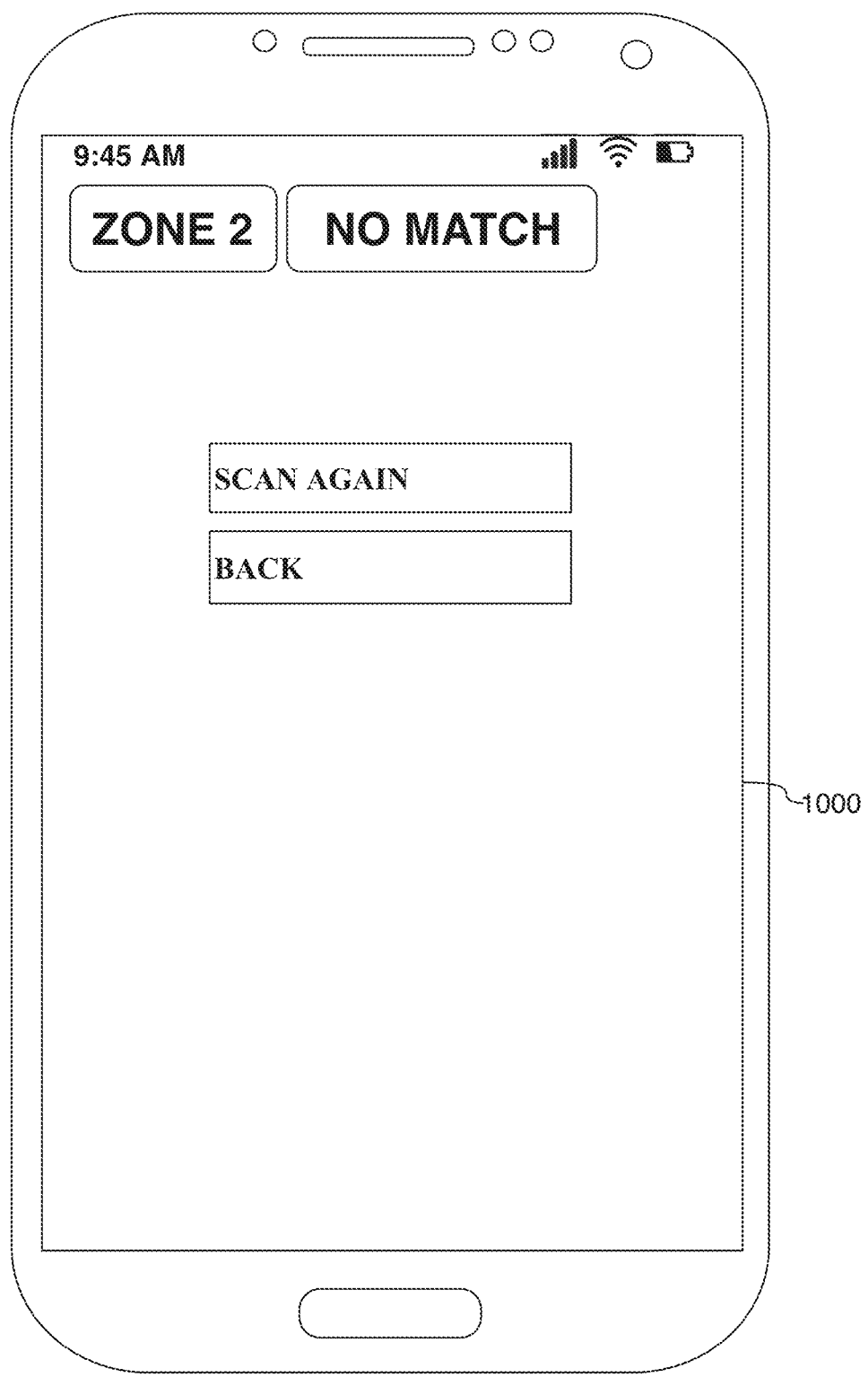
FIG. 10 is a front view of another interface of the system of FIG. 3.

If a match is not found then an interface such as interface 1000 of FIG. 10 may be displayed, which indicates that a match for the wireless wearable is not found in the database or otherwise that, after querying the database, the person or transaction is not authorized to proceed. For example, interface 1000 indicates that there is simply no match found and includes a selector to scan again or to return to the last interface or to the menu. Interface 1100 of FIG. 11 indicates that there is a match but that the person is attempting entry outside of the time window (in this case the person is simply 15 minutes early by attempting entry at 8:45 when entry is not permitted until 9 AM). Interface 1100 could also/alternatively indicate if a person has been blocked, or is attempting entry into the wrong (or an unpermitted) zone, and so forth. The app may also generate certain sounds using the audio output of the mobile device to indicate matches, non matches, blocked persons, a failed scan attempt (no discernible return signal), and so forth. An interface indicating a failed scan attempt may be shown when the scan receives no discernible return signal.

In implementations the wireless wearables and system elements may be configured for two-way encrypted communications and may be configured to comply with banking protocols and/or other security protocols.

There are various uses for the wireless wearables and systems disclosed herein. The use cases and examples above have been given in reference to attendance at an event, but there are many other uses. For example, the wireless wearable could be associated with one or more payment methods (one or more credit or debit cards) through the database and may allow the person to complete a purchase or financial transaction by placing the wireless wearable within reading distance of an NFC/RFID reader to authorize the transaction. For added security, the user may be required to input a pin number. In implementations the wireless wearables and systems may be integrated with third-party readers for payment, such as allowing users to pay for restaurant meals/services using the wireless wearables through a ZIOSK payment tablet. The wireless wearables and systems may be utilized to enable the opening of locked doors as described above, or the toggling of alarm systems between on/off states. The wireless wearables could be used for double identification verification in a secure workplace setting, or for the opening of doors or security doors, or for entry onto an elevator, or exit from an elevator to certain secure floors, and so forth.

The system shown in FIG. 3 may also have one or more end user mobile devices or computing devices coupled with the system through the telecommunications network, as has been previously described with respect to device 314. The end user may be able to access a website using the web server to upload a photo of the wearer, banking and credit card or other payment information, contact information, etc., to associate the payment methods with the end user through the database. In implementations this may also all be done using the end user (attendee) mobile app previously described.

Another security mechanism may include allowing the wireless wearable to accurately identify that the wearer is the authorized person or owner of the wireless wearable by measuring outer-skin glucose levels using a secondary chip also embedded within the wireless wearable and configured for that purpose (and in communication with the NFC/RFID chip or otherwise readable through an NFC/RFID scan).

The wireless wearables and systems could also be used together with social media for a variety of purposes, allowing end users to create their own networks or groups for their own purposes and/or to facilitate more complex interactions. For example, an event organizer may create an event on a social media platform (such as FACEBOOK) and each user who signs up through the social media site may be able to indicate an identification number of the user's wireless wearable (or otherwise provide login details related to the wireless wearable, or the wireless wearable may previously have been associated with the user through the social media account) so that, upon payment, the user does not receive a ticket or the like but the previously-used wireless wearable is simply authorized to allow the user into the event. One person could buy a ticket for a friend or family member to a certain event and authorize the friend or family member to attend by that person's wireless wearable being authorized instead of receiving a ticket or the like, as well. All of this could be done for conferences, concerts, theme parks, sports events, and so forth. Social media accounts may allow persons to host private gatherings. The invited persons may each upload a selfie photograph using the social media account, the host may send out wireless wearables to the persons invited, and someone at the door(s) of the event may scan the wireless wearables using a reader and check each person's identification by verifying against the photo of the person which appears on a user interface of the reader, to determine whether to let the person in. Similar private gatherings could be had without a person having to verify attendees if the premises are by default locked and the doors only unlock temporarily for persons with authorized wireless wearables.

For events the wireless wearables could also validate a certain number of free drinks or food items, a certain number of gift items, etc. Alternatively, the wearer could have previously paid some amount to receive a certain amount of drinks and snacks or food, and the wireless wearable can then be authorized for that amount of drinks and snacks or food. In such an implementation waiters/waitresses and hosts may utilize the event organizer app by using interfaces (not shown in the drawings) which allow them to know if a person has prepaid for drinks/snacks/food, or to know how many more they are authorized to take, and so forth.

The wireless wearables and systems could be used for simplification and/or additional security during air travel. In healthcare implementations the wireless wearables could be used together with medical records, allowing emergency or medical personnel to scan a wireless wearable and bring up medical information associated with a person through the database (such as for a person who is unconscious or unable to respond). Such wireless wearables may have a logo or coloring indicating that they are medical wireless wearables and would be less bulky than metallic medical bracelets that are in use today. Wireless wearables and systems may be used for employees to clock in and clock out at a workplace by scanning the wireless wearables. They may be used to provide manager authorization for a transaction without requiring the typing in of a password but simply by scanning the wireless wearable. The wireless wearables and systems may further allow keyless entry into homes and cars, locking of home doors upon exit, and so forth.

In implementations one or more moisture barrier layers or the like may be utilized to encapsulate or protect the chip before encapsulating the chip within the wireless wearable during fabrication of the wireless wearable. The wireless wearable may be formed using any of the methods or materials disclosed in the aforementioned '962, '278, '574, and/or '956 patent applications. If desired the chip could first be enclosed within some colored covering (or the chip itself may be colored a certain color) so that the chip is not visible once encapsulated within the wireless wearable, or in other words so that the chip blends with the color of the wireless wearable.

In discussing the system of FIG. 3 it should be understood that while database servers, web servers, app servers and so forth are shown as single discrete elements, in some implementations one or more or all of these could be implemented as virtual servers on the same machine, or as dedicated machines for each server, or as cloud servers, and that there may be multiple (and many) of each type depending on the number of users and the needs of the system.

In places where the phrase "one of A and B" is used herein, including in the claims, wherein A and B are elements, the phrase shall have the meaning "A or B." This shall be extrapolated to as many elements as are recited in this manner, for example the phrase "one of A, B, and C" shall mean "A, B, or C," and so forth.

In places where the description above refers to specific embodiments of wireless wearables and related systems and methods, one or more or many modifications may be made without departing from the spirit and scope thereof. Details of any specific embodiment/implementation described herein may, wherever possible, be applied to any other specific implementation/embodiment described herein.

What is claimed is:

1. A wireless wearable method, comprising:
    sending a wireless wearable, packaged within a container, to an event organizer, the wireless wearable comprising a wearable item fully encasing a Near Field Communication (NFC) chip;
    receiving, at one or more servers communicatively coupled with a database, from the event organizer, through one or more interfaces of an event organizer computer communicatively coupled with the database, a first code associated through the database with the wireless wearable;
    receiving at the one or more servers, from an attendee, through one or more interfaces of an attendee computing device communicatively coupled with the database, a second code associated through the database with the wireless wearable;
    receiving at the one or more servers, from a checkpoint device communicatively coupled with the database, an NFC code of the NFC chip; and
    sending to the checkpoint device, from the one or more servers, in response to receiving the NFC code of the NFC chip, an indication of whether the attendee is authorized for entry into an event;
    wherein the first code is a first QR code (QR1), wherein the second code is a second QR code (QR2), wherein the method further comprises storing in the database, in response to receiving user input at one or more user interfaces displayed on an administrator computing device communicatively coupled with the database, the NFC code of the NFC chip, QR1, QR2, a first identifier (ID1), and a second identifier (ID2); wherein the method further comprises, through the database, associating the NFC code and QR2 with ID2, associating QR1 with ID1, and associating ID1 with ID2.

2. The method of claim 1, further comprising, in response to receiving user input at the one or more user interfaces displayed on the administrator computing device, associating a batch number with the wireless wearable through the database and associating an indicator of the event organizer with the wireless wearable through the database.

3. A wireless wearable system, comprising:
    a finger ring comprised of an elastic polymer and having a Near Field Communication (NFC) chip embedded therein;
    an admin computing device communicatively coupled with a database and displaying one or more interfaces for storing and associating data within the database;
    wherein the database has stored therein a first identifier (ID1), a second identifier (ID2), a first quick response code (QR1), a second quick response code (QR2), and an NFC code of the NFC chip; and
    wherein, through the database, ID1 is associated with QR1, ID1 is associated with ID2, and ID2 is associated with the NFC code and with QR2.

4. The system of claim 3 further comprising a container for the finger ring, wherein QR1 is located outside the container so that it is visible before the container is opened.

5. The system of claim 3 further comprising a container for the finger ring, wherein QR2 is located inside the container so that it is not visible until the container is opened.

6. The system of claim 5, wherein the container further comprises a metallic foil shield configured to prevent reading the NFC code of the NFC chip until the finger ring is removed from within the metallic foil shield.

* * * * *

UNITED STATES PATENT AND TRADEMARK OFFICE
CERTIFICATE OF CORRECTION

| | | |
|---|---|---|
| PATENT NO. | : 10,839,629 B2 | Page 1 of 1 |
| APPLICATION NO. | : 16/413601 | |
| DATED | : November 17, 2020 | |
| INVENTOR(S) | : Brighton Jones, Aaron Dalley and Arthur Mrozowski | |

It is certified that error appears in the above-identified patent and that said Letters Patent is hereby corrected as shown below:

In the Specification

In Table 1 at Column 11, Lines 39-41, in the "Group" column, the wording "Event Access Attributes" should be raised one row (to Line 39) so that the "Event Access Attributes" group is displayed as including the "Event ID" row of the "Element/Identifier" column.

Signed and Sealed this
Twenty-second Day of December, 2020

Andrei Iancu
*Director of the United States Patent and Trademark Office*